US010819645B2

(12) United States Patent
Westphal et al.

(10) Patent No.: US 10,819,645 B2
(45) Date of Patent: *Oct. 27, 2020

(54) COMBINED METHOD FOR DATA RATE AND FIELD OF VIEW SIZE ADAPTATION FOR VIRTUAL REALITY AND 360 DEGREE VIDEO STREAMING

(71) Applicant: Futurewei Technologies, Inc., Plano, TX (US)

(72) Inventors: Cedric Westphal, San Francisco, CA (US); Syed Obaid Amin, Fremont, CA (US)

(73) Assignee: FUTUREWEI TECHNOLOGIES, INC., Plano, TX (US)

(*) Notice: Subject to any disclaimer, the term of this patent is extended or adjusted under 35 U.S.C. 154(b) by 103 days.

This patent is subject to a terminal disclaimer.

(21) Appl. No.: 16/047,865

(22) Filed: Jul. 27, 2018

(65) Prior Publication Data

US 2019/0089643 A1    Mar. 21, 2019

Related U.S. Application Data

(60) Provisional application No. 62/561,121, filed on Sep. 20, 2017.

(51) Int. Cl.
| *H04L 12/841* | (2013.01) |
| *H04N 21/238* | (2011.01) |
| *H04N 21/6587* | (2011.01) |
| *H04N 21/218* | (2011.01) |
| *H04N 21/442* | (2011.01) |
| *H04N 21/81* | (2011.01) |
| *H04N 21/6373* | (2011.01) |

(Continued)

(52) U.S. Cl.
CPC ..... *H04L 47/283* (2013.01); *H04N 21/21805* (2013.01); *H04N 21/238* (2013.01); *H04N 21/4331* (2013.01); *H04N 21/44209* (2013.01); *H04N 21/6373* (2013.01); *H04N 21/6587* (2013.01); *H04N 21/816* (2013.01); *H04N 5/23238* (2013.01); *H04N 5/232945* (2018.08)

(58) Field of Classification Search
USPC ......................................... 370/235
See application file for complete search history.

(56) References Cited

U.S. PATENT DOCUMENTS 9,723,223 B1    8/2017    Banta et al.
9,743,060 B1    8/2017    Matias et al.
(Continued)

*Primary Examiner* — Angel T Brockman
(74) *Attorney, Agent, or Firm* — Vierra Magen Marcus LLP

(57) ABSTRACT

The disclosure relates to technology for a 360 degree video stream in a network. A network round trip time (RTT) is measured for a requested FoV of the 360 degree video stream, where the RTT indicates a time interval between sending a FoV interest message and receiving a response message in reply to the requested FoV. The network bandwidth is measured for the requested FoV of the 360 degree video stream, where the measured network bandwidth represents an amount of data the network transmits in the response message. A future FoV of the 360 degree video stream is then determined based on the requested FoV, the measured network bandwidth and the measured network RTT, and a video stream is prefecthced for the future FoV of the 360 degree video stream.

18 Claims, 16 Drawing Sheets

(51) Int. Cl.
*H04N 21/433* (2011.01)
*H04N 5/232* (2006.01)

(56) References Cited

U.S. PATENT DOCUMENTS

| | | |
|---|---|---|
| 10,062,414 B1 * | 8/2018 | Westphal ......... H04N 21/23106 |
| 2002/0030741 A1 | 3/2002 | Broemmelsiek |
| 2003/0068098 A1 | 4/2003 | Rondinelli et al. |
| 2012/0105473 A1 | 5/2012 | Bar-Zeev et al. |
| 2017/0026577 A1 | 1/2017 | You et al. |
| 2017/0295324 A1 | 10/2017 | Cabral et al. |
| 2018/0007489 A1 | 1/2018 | Lehtiniemi et al. |
| 2018/0063504 A1 | 3/2018 | Haines |
| 2018/0077451 A1 | 3/2018 | Yip et al. |
| 2018/0091221 A1 | 3/2018 | Bitra et al. |
| 2018/0098131 A1 | 4/2018 | Zhou |

* cited by examiner

600

| Frame ID | Quality | Top | Bottom | ... | Left |
|---|---|---|---|---|---|
| 1 | UHD | /movie1/frame1/top/uhd/chunk1<br>/movie1/frame1/top/uhd/chunk2<br>...<br>/movie1/frame1/top/uhd/chunkN | /movie1/frame1/bottom/uhd/chunk1<br>/movie1/frame1/bottom/uhd/chunk2<br>...<br>/movie1/frame1/bottom/uhd/chunkN | ... | /movie1/frame1/left/uhd/chunk1<br>/movie1/frame1/left/uhd/chunk2<br>...<br>/movie1/frame1/left/uhd/chunkN |
|  | HD | /movie1/frame1/top/hd/chunk1 | /movie1/frame1/bottom/hd/chunk1 | ... | /movie1/frame1/left/hd/chunk1 |
|  | SD | /movie1/frame1/top/sd/chunk1 | /movie1/frame1/bottom/sd/chunk1 | ... | /movie1/frame3/left/hd/chunk1 |
| ... |  | ... | ... |  | ... |

| Time | FoV | Interest1 | Interest2 | ... | InterestN |
|---|---|---|---|---|---|
| T1 | Top | /movie1/frame1/top/uhd/chunk1 | /movie1/frame1/bottom/sd/chunk1 | ... | /movie1/frame1/left/hd/chunk1 |
| T2 | Top | /movie1/frame2/top/uhd/chunk1 | /movie1/frame2/bottom/sd/chunk1 | ... | /movie1/frame2/left/hd/chunk1 |
| T3 | Bottom | /movie1/frame3/top/sd/chunk1 | /movie1/frame3/bottom/uhd/chunk1 | ... | /movie1/frame3/left/hd/chunk1 |
| ... |  |  |  |  |  |

*FIG. 6B*

| Time | FoV | Interest1 | Interest2 | ... | InterestN |
|---|---|---|---|---|---|
| T1 | Top | /movie1/frame1/tile1/uhd/chunk1 | /movie1/frame1/tile2/sd/chunk1 | ... | /movie1/frame1/tileN/hd/chunk1 |
| T2 | Top | /movie1/frame2/tile1/uhd/chunk1 | /movie1/frame2/tile2/sd/chunk1 | ... | /movie1/frame2/tileN/hd/chunk1 |
| T3 | Bottom | /movie1/frame3/tile1/sd/chunk1 | /movie1/frame3/tile2/uhd/chunk1 | ... | /movie1/frame3/tileN/hd/chunk1 |
| ... | | | | | |

COMBINED METHOD FOR DATA RATE AND FIELD OF VIEW SIZE ADAPTATION FOR VIRTUAL REALITY AND 360 DEGREE VIDEO STREAMING

CLAIM FOR PRIORITY

This application claims the benefit of priority to U.S. Provisional Appl. No. 62/561,121, filed Sep. 20, 2017, the contents of which are hereby incorporated by reference.

FIELD

The present disclosure generally relates to providing a 360 degree video stream in a network, and in particular, to a combined method for data rate and field of view (FoV) size adaption for virtual reality (VR) and 360 degree video streaming in a network.

BACKGROUND

Virtual reality (VR) and 360 degree video streaming are growing rapidly. One of the challenges in 360 degree video streaming is the high bandwidth demands that are required for streaming such high-quality 360 degree video. Existing solutions reduce bandwidth consumption by streaming high-quality video only for the user's viewport, and otherwise limiting the quality. However, adding the spatial domain (viewport) to the video adaptation space prevents the existing solutions from buffering future video chunks for a duration longer than the interval that user's viewport is predictable. This makes playback more prone to video freezes due to rebuffering, which severely degrades the user's Quality of Experience (QoE) especially under challenging network conditions.

Given the large amounts of data being transferred in VR and 360 degree video streaming, Information Centric Networking (ICN) has emerged as a promising candidate for supporting such large video streams over a network between content producers and consumers. Different from conventional IP routers, ICN routers may combine content routing, content computing power, and content local cache/storage capabilities. In some ICN models, such as content centric network (CCN)/named data networking (NDN) models, a content name (e.g., a prefix) may be used for content routing, which may define the content reachability to guide content retrieval from ICN routers. Nevertheless, while use of ICNs may address some of the bandwidth issues in large content delivery, many challenges still remain.

BRIEF SUMMARY

According to one aspect of the present disclosure, there is a computer implemented method for providing a 360 degree video stream in a network, the 360 degree video stream comprising multiple video streams corresponding to multiple Field of Views (FoVs), the method including measuring a network round trip time (RTT) for a requested FoV of the 360 degree video stream, the RTT indicating a time interval between sending an FoV interest message and receiving a response message in reply to the requested FoV; measuring a network bandwidth for the requested FoV of the 360 degree video stream, the measured network bandwidth representing an amount of data the network transmits in the response message; determining a future FoV of the 360 degree video stream based on the requested FoV, the measured network bandwidth and the measured network RTT; and prefetching a video stream for the future FoV of the 360 degree video stream.

Optionally, in any of the preceding aspects, the determining a future FoV includes selecting a size of the future FoV based on the requested FoV and the measured network RTT; and selecting an amount of data of the future FoV based on the requested FoV, the selected size of the future FoV and the measured network bandwidth.

Optionally, in any of the preceding aspects, wherein selecting the size of the future FoV includes creating a requested FoV having the selected size by adding an amount of height and width to the requested FoV based on an amount that the measured network RTT is greater than a threshold RTT, or subtracting an amount of height and width from the requested FoV based on an amount that the measured network RTT is less than the threshold RTT.

Optionally, in any of the preceding aspects, the future FoV includes the requested FoV having the selected size; and the selecting the amount of data of the future FoV includes adding an amount of data to the future FoV based on an amount that the measured network bandwidth is greater than a threshold network bandwidth, or subtracting an amount of data from the future FoV based on an amount that the measured network bandwidth is less than the threshold network bandwidth.

Optionally, in any of the preceding aspects, the method further includes selecting the threshold RTT to be a previously measured RTT; and selecting the threshold network bandwidth to be an amount of data bandwidth for sending data to satisfy the requested FoV having the selected size, at a link capacity of the network during the measured RTT.

Optionally, in any of the preceding aspects, the prefetching comprises sending a current FoV interest message towards a source of the 360 degree video stream, the current FoV interest message including a request for the determined future FoV; and further includes sending the FoV interest message to the source at a prior time instant of the 360 degree video stream, the FoV interest message including a request for the FoV.

According to another aspect of the present disclosure, there is a 360 degree video stream in a network provider device, the 360 degree video stream comprising multiple video streams corresponding to multiple FoVs, the device including a memory storage comprising instructions; and one or more processors in communication with the memory storage, wherein the one or more processors execute the instructions to measure a network round trip time (RTT) for a requested FoV of the 360 degree video stream, the RTT indicating a time interval between sending an FoV interest message and receiving a response message in reply to the requested FoV; measure a network bandwidth for the requested FoV of the 360 degree video stream, the measured network bandwidth representing an amount of data the network transmits in the response message; determine a future FoV of the 360 degree video stream based on the requested FoV, the measured network bandwidth and the measured network RTT; and prefetch a video stream for the future FoV of the 360 degree video stream.

According to still another aspect of the present disclosure, there is a non-transitory computer-readable medium storing computer instructions for providing a 360 degree video stream in a network, the 360 degree video stream comprising multiple video streams corresponding to multiple FoVs, that when the computer instructions are executed by one or more processors, cause the one or more processors to perform the steps of measuring a network round trip time (RTT) for a requested FoV of the 360 degree video stream, the RTT indicating a time interval between sending an FoV interest message and receiving a response message in reply to the requested FoV; measuring a network bandwidth for the requested FoV of the 360 degree video stream, the measured network bandwidth representing an amount of data the network transmits in the response message; determining a future FoV of the 360 degree video stream based on the requested FoV, the measured network bandwidth and the measured network RTT; and prefetching a video stream for the future FoV of the 360 degree video stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate like elements.

FIG. 6A illustrates an example of a naming scheme for addressing FoVs of FIGS. 3-4.

FIG. 6B shows an example of FoV interest messages.

DETAILED DESCRIPTION

Figure 1:
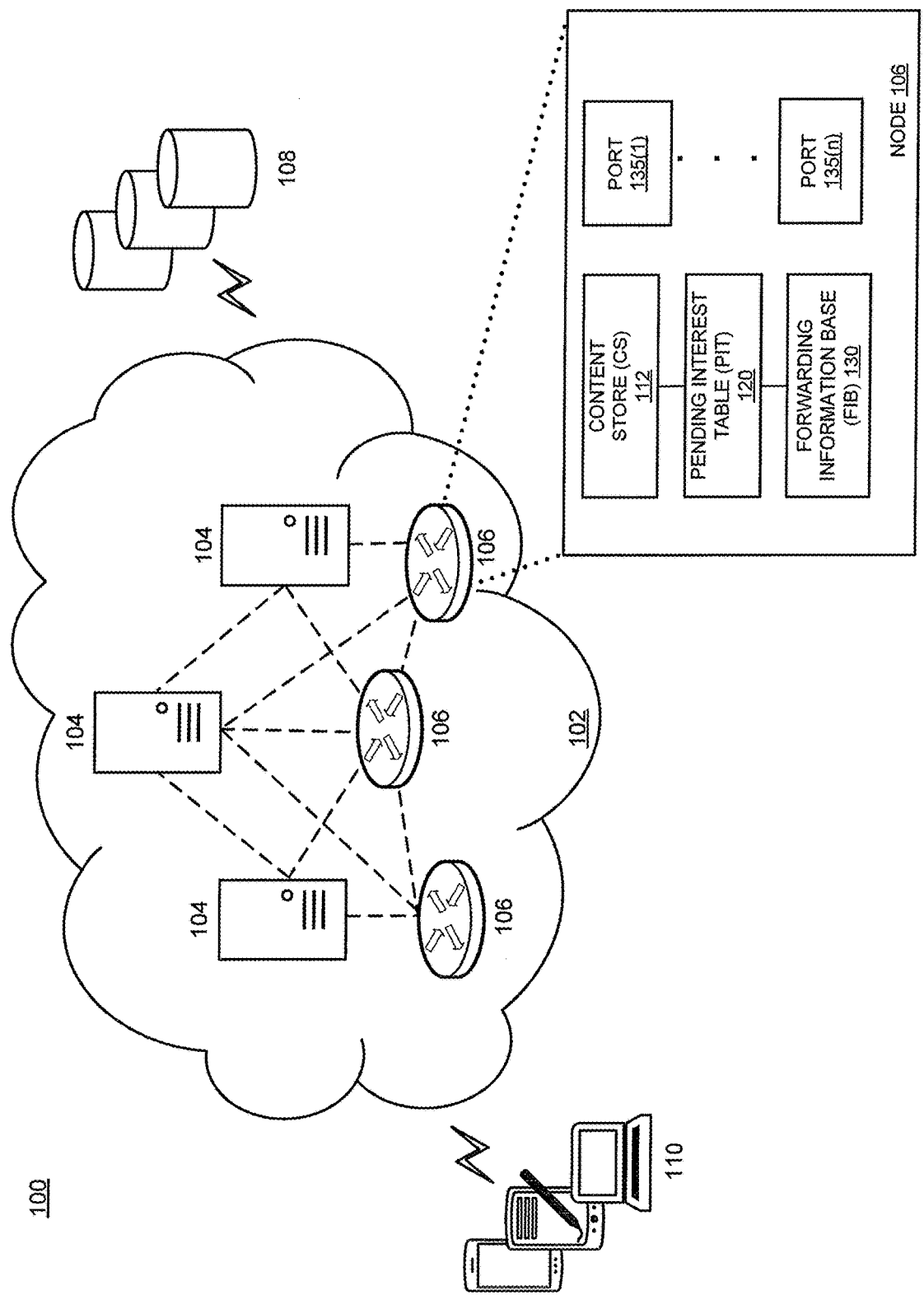
FIG. 1 illustrates a network environment an ICN.

The present disclosure generally relates to providing a 360 degree video stream in a network, and in particular, to a combined method for data rate and field of view (FoV) size adaption for virtual reality (VR) and 360 degree video streaming in a network.

A 360 degree video, also known as 360 videos, immersive videos, or spherical videos, may be video recordings of a real-world panorama, where the view in every direction is recorded at the same time, shot using an omnidirectional camera or a collection of cameras, and filming overlapping angles simultaneously. The quality of these videos can be low unless they are bumped up to super high resolution such as 4K video having a horizontal resolution in the order of 4,000 pixels, super high definition video, or 8K video having a horizontal resolution in the order of 8,000 pixels. In some cases, streaming 360 degree videos takes up to six times as much bandwidth as a traditional video.

Once created, 360 degree videos (e.g., streams) may be viewed with or at a user device, such as via personal computers, mobile devices such as smartphones, or head-mounted displays (HMDs). During viewing, the FoV may change as a result of user behavior, for example by the user changing view or the user device moving in a different direction while viewing. For example, when viewed on PCs, a mouse may be used to pan around the video by clicking and dragging. On smartphones, internal sensors such as a gyroscope may be used to pan the video based on the orientation of the device. Dedicated HMDs may use internal sensors and dedicated screens of their own. Such behavior may cause the user device to request a new or updated FoV.

It is appreciated that one important feature of viewing videos is the quality of the resolution. Thus, higher resolution video, such as ultra-high definition, is often preferred over lower resolution video, such as standard definition. However, as the resolution of the video increases, the resources necessary to transmit the video also increases. This strain on network resources can be reduced by predetermining locations of future (upcoming) FoVs that a user is likely to access while the user is viewing a current FoV. Once determined, the user device can prefetch the video stream for these future FoVs.

In one embodiment, predetermining and prefetching may be accomplished by considering network factors, such as network bandwidth and round trip time (RTT) between a user device and the source of the video. For example, a future FoV may be determined by increasing the size of a currently requested FoV (in all directions or specified directions) based on increases in the length of the RTT. Accordingly, the future FoV can be prefetched in such a manner so that when it arrives, the increased size will include higher resolution data to cover any change in FoV location caused by the user viewing direction changing or movement of the user device during the RTT. In one embodiment, the increase in size may be limited by the maximum available bandwidth, which may be predicted based on previously measured bandwidths.

By performing such determining and prefetching, the present technology can reduce bandwidth consumed by a network that is providing high resolution 360 degree video streams to users, and increase resolution of the streams. This can provide a smooth video experience for the user without a large increase in network bandwidth that would be required to prefetch or send all the possible FoVs following the currently viewed FoV.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1 illustrates a network environment to provide content in an ICN. As briefly described above, ICN integrates name-based routing and in-network caching as fundamentals of the network infrastructure. One variation of ICN includes NDN. In NDN, communications are driven by receivers, i.e. data consumers, through the exchange of two types of packets: interest packets (or messages) and data packets (or messages). In an Interest message, a consumer places the name of a desired piece of data into the Interest message and sends it to the network. Routers use the name to forward the Interest toward the data producer(s). In a Data packet, once the Interest message reaches a node that has the requested data, the node will return the Data packet that contains both the name and the content, together with a signature by the producer's key which binds the two. The Data packet typically follows in reverse the path taken by the Interest message to get back to the requesting consumer.

The network environment 100 may include the ICN 102 having controllers, such as ICN managers 104. The ICN managers 104 may be, for example, a network entity that may control over set of network resources in a data plane. The ICN managers 104 may be deployed in a distributed, centralized or hybrid manner depending upon the Internet Service Providers (ISPs).

ICN 102 may also include routers (or nodes) 106, which may include storage to cache content as it propagates through the ICN 102. The routers 106 may also be communicatively coupled with the ICN managers 104 and may be configured to process requests received from users for accessing the content via user devices 110, such as a mobile device or computer.

In one embodiment, 360 degree videos may be streamed from producers over ICN 102 using routers 106 (and optionally managers 104) to a requesting device, such as user devices 110. The producer may be a content provider, a content store (e.g., data stores 108 as noted below), a server or a data origin server that provides 360 degree video content. In one instance, video streams may be perfected in ICN 102 for FoVs of the 360 degree video, as explained below.

The routers 106 may collaborate for caching content with one or more other routers 106 in the network, such as an ICN 102, using input/output (I/O) ports 135(1) to 135(n), which are configured to receive and transmit data to/from other routers 106 in the ICN 102. The routers 106 may comprise at least three main data structures in which to carry out Interest messages and data packet forwarding functions: the Forwarding Information Base (FIB) 130 that may associate the content names (e.g., streaming 360 degree video content) to the forwarding face(s) towards the producer(s), the Pending Interest Table (PIT) 120 that may record the incoming faces where the interests came from and have not replied by producer, and the Content Store (CS) 112 that may cache content from a producer when it is forwarded to the requesters.

The PIT 120 may be any data structure used to record and keep track of the received interests (e.g., 360 degree video content) that are being served or pending (until the corresponding requested content data is received). Thus, the PIT may be used to route data packets back to the requester.

The FIB 130 may be any data structure (e.g., a table, list, or database) used to associate content data (e.g., 360 degree video content) with corresponding ports (for next hops) on which the interests and content data are received and forwarded. The FIB 130 entries may indicate the next hops on which content (interests) may be forwarded. The FIB 130 may be a data structure or a sub-data structure (e.g. a data structure within a data structure, such as a table, list, or database which may be maintained and operated (to process content interest and data) at a data plane or forwarding plane. The data plane may comprise operations for transferring content information (interest and data) in the network, and the control plane may comprise operations related to controlling network operations including the data plane operations. The data structures above may be stored and maintained in a storage or memory unit of the router 106.

The CS 112 may be used (e.g., in non-transitory memory storage) to cache (for relatively short time) or store (for relatively longer time) content data. Content data may include, for example, 360 degree video content, and data used for prefetching video streams for FoVs of the 360 degree video. The CS 112 may also receive and associate interests with corresponding requested content data.

The network environment 100 may further include data stores 108, which may store the content (e.g., 360 degree video content and data used for prefetching video streams for FoVs) or collections of content, such as files, images, videos and the like. Accordingly, the managers 104 and the routers 106 may communicate with the data stores 108 to provide content to different users. In one embodiment, stores 108 may be computer servers capable of providing 360 degree video content and data used for prefetching video streams.

Additionally, the network environment 100 may include one or more user devices 110 including for example and without limitation, a mobile wireless communication device, wireless transmit/receive unit (WTRU), mobile station, fixed or mobile subscriber unit, pager, cellular or mobile telephone, personal digital assistant (PDA), smartphone, laptop, computer, touchpad, or consumer electronics device or other portable computers, network computers, landline phones, and the like. In some instances, devices 110 may be described as computer clients capable of viewing, receiving, transmitting and displaying streamed video and other content to a user or another device. In some instances, devices 110 may be capable of receiving data used for prefetching video streams for FoVs of the 360 degree video. In some instances, the devices 110 may send FoV interest messages and receive FoV data messages in response to those interest messages.

In one other embodiment, node 106 may additionally or optionally include components such as an RTT measurer, a bandwidth measurer, a FoV determiner and a video stream prefetcher (not shown). These components may be executed on a single processor or separate processors and may be implemented with any combination of hardware and/or software.

The RTT measurer may measure a network RTT for a requested FoV of the 360 degree video stream (e.g., at one time instant of the 360 degree video stream). For example, the network RTT may be an amount of time that elapses between sending a prior FoV interest message to a source (producer) of the 360 degree video stream and receipt of a response message from the source.

The bandwidth measurer measures network bandwidth or throughput that is available to transmit content, such as the requested FoV for the 360 degree video. The measured network bandwidth may represent an amount (e.g., the maximum amount) of data the network is capable of transmitting in the response message in reply to a request for content in the interest message. In one embodiment, a threshold network bandwidth is an amount of data bandwidth for sending data to satisfy a requested FoV for the 360 degree video, in which a size of the video has been selected at a link capacity of the network during a measured network RTT.

The FoV determiner determines future or upcoming FoVs of the 360 degree video stream based on, for example, the requested FoV, the measured network RTT and the measured network bandwidth.

Figure 2:
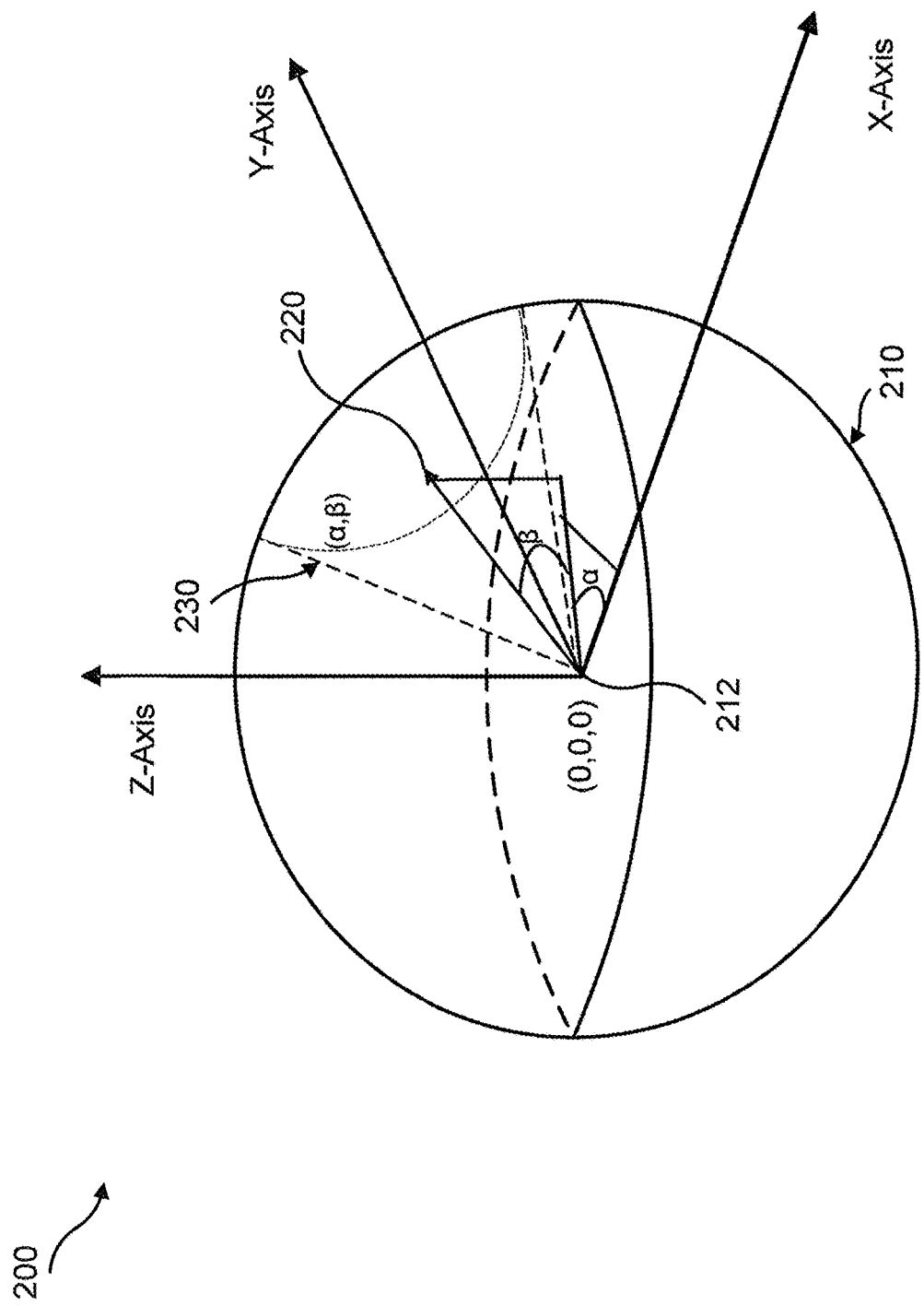
FIG. 2 illustrates an example 360 degree video stream field of view.

The video stream prefetcher may prefetch (or cause to be prefetched) video streams for the future FoVs of the 360 degree video stream. The prefetching may be performed at an edge router through which the video is being transmitted or streamed or at a client at which the video is being displayed or viewed. In one embodiment, the video streams for the future FoVs may be prefetched in advance of being viewed FIG. 2 illustrates an example 360 degree video stream FoV (e.g., front tile) having a center defined in spherical coordinates. The spherical coordinates of example 200 are shown with X-Axis, Y-Axis and Z-Axis for ease of reference, although as explained below, spherical coordinates are not in, but can be mapped into, the X,Y,Z coordinate space. The 360 degree video stream may be streamed in network environment 100 of FIGS. 1A-B, such as on network 102 from stores 108 through nodes 106 and/or managers 104 to user devices 110.

As depicted, the figure shows a 360 degree video stream with multiple FoVs 210 and specific FoV 230 having a center 220 at $(\alpha,\beta)$ defined in spherical coordinates. FoV 230 may represent a "next," "current," "determined future" or "future" FoV as described herein. In some instances, FoV 230 may be identified or described by the vector in spherical coordinates pointing from the origin (0,0,0) to the center of the FoV at $(\alpha,\beta,r)$. Here, since we are concerned with where the direction vector is pointing to in spherical coordinates, the radial distance 'r' is not required. In one case, 'r' can be presumed to be 0 (or 1) as the radius of the sphere having FoVs 210. It can be appreciated that other coordinate systems, such as Cartesian coordinates or polar coordinates may be used instead of spherical coordinates to define or identify the FoV.

In some embodiments, the video stream of FIG. 2 may be a 360 degree video stream in a computer network. In some cases, the stream may be a 360 degree video stream in an ICN (or any other network), where the stream includes multiple video streams (e.g., subsets of the stream) corresponding to multiple FoVs. In some cases, the video stream extends over a number of time instants, where each instant has a corresponding FoV 230 that is displayed to the user (e.g., at front tile 310 of FIG. 3). In some instances, the video stream may be described as a 360 degree video stream extending over a time period and including a time ordered sequence of multiple FoVs, such as FoVs 210, each of the multiple FoVs occurring at a time instant.

In one embodiment, FoVs 210 may be all possible FoVs at such a time instant for the video stream, and thus comprise the entire 360 degree view for that instant. FoVs 210 may extend between −180 degrees and +180 degrees horizontally, and between −90 degrees and +90 degrees vertically from the origin. However, it is noted that a FoV may have various shapes and cover various amounts of area of the sphere or FoVs 210. For example, FoV 230 may be rectangular shaped and cover various other horizontal and vertical angles from the center coordinate.

In some instances, based on the user's behavior, FoV 230 may point in one particular direction (e.g., at FoV center 220) and the rest of FoVs 210 may complete the 360 degree view around the user (e.g., at coordinate center 212) for that time instant of the video.

In one further embodiment, the 360 video stream may include or be converted into multiple resolutions, such as Ultra High Definition (UHD) video, High Definition (HD) video, or Standard Definition (SD) video. For example, video currently displayed in a FoV 230 may have a UHD video resolution, whereas other, non-displayed FoVs 210 may have a lower resolution, such as SD video. Accordingly, each portion or segment of the 360 degree video stream may be divided into 'n' FoVs with different resolutions, as explained with reference to FIGS. 3 and 4 below.

Figure 3:
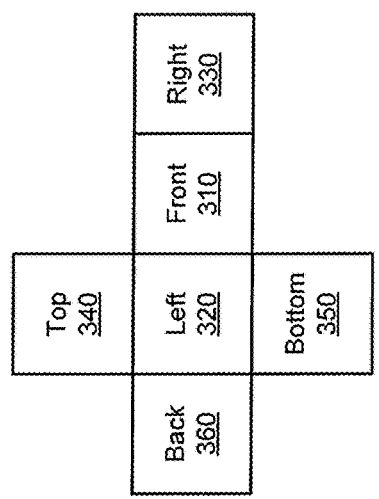
FIG. 3 illustrates an example of multiple field of views at a time instant of the 360 degree video stream of FIG. 2.

FIG. 3 illustrates an example of multiple FoVs of a 360 degree video stream. The video is first projected to a two-dimensional plane using a projection method, such as equirectangular, cubemap or pyramid projection. In the depicted example, a cubemap projection method is employed. As understood, a cubemap is a collection of six square textures 310, 320, 330, 340, 350 and 360 that represent reflections on an environment.

In the depicted embodiment, the 360 degree video stream is decomposed into a texture 300 that can be mapped to the faces of a cube. The texture 300 has six (6) square tiles (or unfolded into six regions of a single texture) 310, 320, 330, 340, 350 and 360 corresponding to areas around the center $(\alpha,\beta)$ (FIG. 2) of the sphere 210. The square tiles 310, 320, 330, 340, 350 and 360 each represent a side—left, front, right, top, back and bottom, of the cube. Thus, the six squares textures 310, 320, 330, 340, 350 and 360 of the cubemap form the faces of an imaginary cube that surrounds an object, where each face represents the view along the directions of the axes. The square tiles, in different embodiments, may have varying resolutions. For example, the square tiles may include ultra-high definition (UHD) video, high definition (HD) video and/or standard definition (SD) video. Although the disclose embodiment is directed to a six square texture embodiment, it is appreciated that more or less square textures may be identified to form the cubemap.

Figure 4:
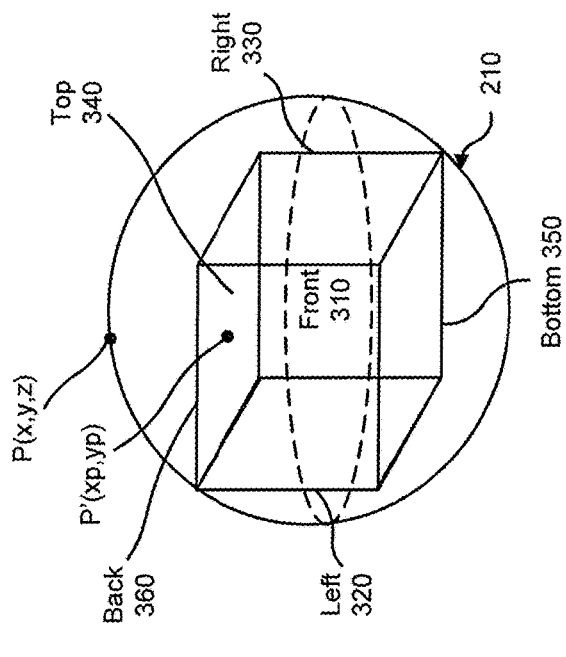
FIG. 4 illustrates an example projection of a sphere onto a cube surrounded by the sphere.

FIG. 4 illustrates an example projection of a sphere onto a cube surrounded by the sphere. The sphere 210 is located outside the cube based on a determination of the largest edge located on the cube in a manner that the spherical frame will contact at the vertices. At the center of the sphere 210 is a viewpoint (not shown) from how a viewer is meant to ingest the video. To determine a region of the sphere 210 as a region of the cube, pixels are mapped based on the viewpoint. A pixel's location on the cube is determined based on an imaginary straight line from the viewpoint to the sphere 210. The point on the cube corresponds to the point where the imaginary line crosses the cube.

The projection 400 shows the cube surrounded by the sphere 210, with the cube having the six tiles 310, 320, 330, 340, 350 and 360 mapped onto each face. The figure conceptually illustrates an example definition of a six-faced cube. As shown in the figure, the six faces of the cube are named as Front 310, Back 360, Left 320, Right 330, Top 340 and Bottom 350. The cube projection format includes mapping a sphere surface point p(x, y, z) to one of the six cube faces, in which both the cube face id and coordinate $(x_p, y_p)$ in the normalized cube projection coordinate system are computed.

Figure 5A:
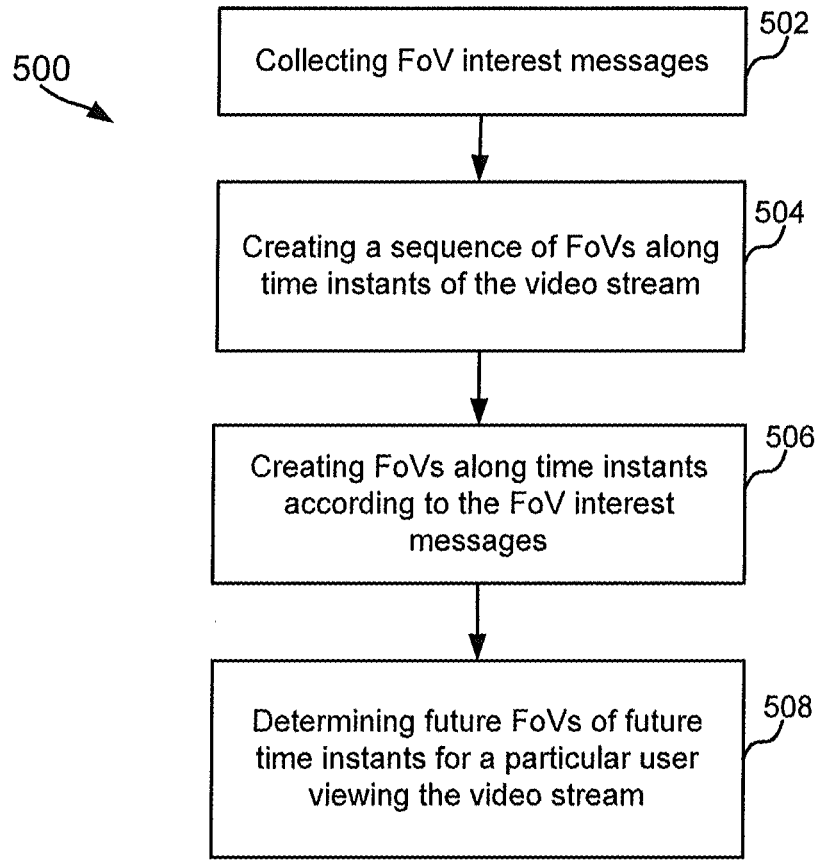
FIG. 5A is an example flow diagram of a process for determining a future FoV for a 360 degree video stream in an ICN.

FIG. 5A is an example flow diagram of a process for determining a future FoV for a 360 degree video stream in an ICN. Process 500 includes collecting the 360 degree video stream FoV at 502, creating a sequence of FoVs at 504 and 506, and determining a future FoV at 508. Process 608 allows for or is a basis for determining, prefetching or caching future FoVs of future time instants (tn) for a particular user viewing the 360 degree video stream with a history of requested FoVs of past time instants (tn).

Process 500 may be a process performed by one of the nodes in network 100 (e.g., a network control plane, edge router and/or server). In some instances, process 500 may be performed by a 360 degree video stream producer (e.g., server 1205 or store 108), an edge router or routers 106 (or a control plane manager (e.g., manager 104)).

Process 500 begins at 502 where FoV Interest Messages from one or more users viewing the 360 degree video stream are collected. Process 502 may include, for example, collecting FoV Interest Messages from one or more users viewing the 360 degree video stream, where each FoV Interest Message includes a request for a FoV at one time instant (tn) of the 360 degree video stream.

In some instances, 502 includes collecting the next FoV following the current FoV of a video sequence, which was previously viewed by multiple users for the same video sequence. This collecting may include monitoring or tracking previously requested interest messages from one or more users as the next FoV following the current FoV viewed by a user in the sequences of FoVs, where the monitored or tracked data is stored as historic messages.

Process 504 may include creating a sequence of FoVs most frequently requested of the multiple FoVs, at each of the periodic time instants (tns), by the one or more users. It is appreciated that a "most frequently requested" of the multiple FoVs may be a FoV having the greatest count, such as by counting the number of requests collected for that FoV as compared the number of requests collected for another FoV by the users at the same time instant (tn) of the video stream.

In some instances, process 504 may include creating a sequence of FoVs over time for the video: FoV(t1), FoV(t2), . . . FoV(tn), where each FoV is a FoV (e.g., most frequently requested) of the multiple FoVs at each of the time instants t1, t2, . . . tn, by the one or more users.

In some instances, process 504 includes creating a sequence of FoVs that were most requested along time instants of the video by the multiple users for each FoV in the original sequence of FoVs. The first sequence may then be used to predict the most likely FoVs, determined future or highest probability FoVs along time instants of the video for subsequent users viewing the video sequence, such as at 508.

At 506, FoV transitions along the time instants may be created according to the FoV interest messages, where each FoV transition includes a current FoV of one of the time instants and a next FoV of a next time instant (and which may be an adjacent time instant), the next FoV indicating a likely next FoV to be requested subsequent to the current FoV.

In some instances, process 506 may include creating transitions at each of the time instants during a time period, each transition being from a FoV most frequently requested to an immediately prior requested FoV at each of the time instants. In one embodiment, a "most frequently requested" of the multiple FoVs may be a FoV having the greatest count, such as by counting the number of requests collected for that FoV as compared the number of requests collected for another FoV by the users at the same time instant (tn) of the video stream.

In some instances, process 506 may include creating a second sequence of most requested transitions of any FoV of the FoVs over time for the video: set of transition FoVs(t1), set of transition FoVs FoV(t2), . . . set of transition FoVs FoV(tn) where each set of transition FoVs includes a FoV transition (e.g., that are the most frequently requested) of the multiple possible transitions from any FoV, at each of the time instants t1, t2, tn, by the one or more users.

In some instances, process 506 includes creating a second sequence to the "next" FoV that were most requested along time instants of the video by the multiple users immediately following a currently viewed FoV by the users in the sequences of FoVs. The second sequence may then be used to predict the most likely FoV, determined future, or highest probability FoV immediately following a currently viewed FoV along time instants of the video by a user in the sequence of FoVs.

At 508, future FoVs of future time instants are determined for a particular user viewing the 360 degree video stream with a history of requested FoVs of past time instants, where the future FoVs are determined based on the history of requested FoVs, the sequence of FoVs and the second sequence of FoVs.

In some instances, process 508 may include determining a future FoV for a time instant during the 360 degree video stream that is a most frequently requested FoV of one of the sequences of the FoVs, where the requested FoV is in a FoV Interest Message sent by a subsequent user viewing the 360 degree video stream.

In some instances, process 508 includes determining at the producers (e.g., server 1205) or a router, future FoVs of future time instants for a particular user viewing the 360 degree video stream, where the future FoVs may be determined based on the history of requested FoVs and the sequence of FoVs (e.g., FoVs that are the most requested at each time instants in the historical data).

The determined future FoVs may then be cached at the client (or router). The cached sequence of FoVs may be used to provide a smooth video experience for the user without significantly increasing network bandwidth. Conventionally, all FoVs for future viewing (future FoVs in reference to the currently viewed FoV) would be prefetched, which consumer significant network bandwidth. Caching will be described further with respect to FIG. 6B.

Figure 5B:
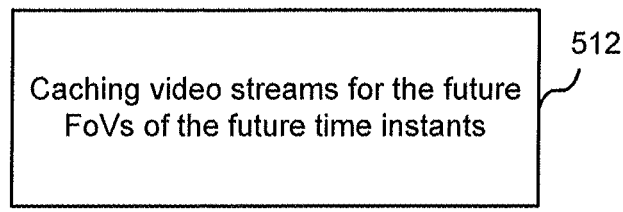
FIG. 5B is an example flow diagram of caching video streams for future FoVs.

FIG. 5B is an example flow diagram of caching video streams for the future FoVs in an ICN. Process 512 may occur, for example, after process 508 of FIG. 5A. Process 512 caches video streams for the future FoVs of the future time instants. In one embodiment, the video streams for the future FoVs are cached prior to receiving requests for the future FoVs of the future time instants for the particular user viewing the 360 degree video stream. In some instances, at 512, a requested FoV by a subsequent user viewing the video stream is cached as the most frequently requested FoV for the next time instant of the video being watched by particular users.

FIG. 6A illustrates an example table of namespaces for addressing the tiles depicted in FIGS. 3-4. A namespace can be used to identify 360 degree videos streamed across a network, such as ICN 102. Applying an example, let us assume a namespace as: /<video-id>/<frame-id>/<fov>/<resolution>/<chunk-id>. In this example, <video-id> identifies the name of the video, <frame-id> identifies a frame of the video, <fov> identifies a tile (or FoV) for the frame of the video, <resolution> identifies a resolution (e.g., number of pixels or amount of data) for the video and <chunk-id> identifies the chunk or area portion (such as size) of the tile (or FoV) having the resolution.

Applying a cubemap projection, the names of each chunk of data (e.g., chunks 1-N) from the 360 degree video stream are identified in table 600. Table 600 lists the namespace for each of the tiles (e.g., tiles 310, 320, 330, 340, 350 and 360) illustrated in FIGS. 3-4, where the resolution or quality of the video are shown in three different formats—UHD, HD or SD. In particular, table 600 shows frame 1 for a video having resolutions UHD, HD and SD. As depicted, and following the namespace format identified above, the name of the video stream is "movie1," of a first frame "frame 1" of a "top" tile (e.g. top 340) in which the resolution is "UHD" for chunks 1-N. Namespaces are similarly identified for frame 1 in HD and SD resolutions. As appreciated, table 600 shows a single frame (frame 1). However, the table may include any number of frames such that the entire 360 degree video stream is captured.

FIG. 6B shows an example table of FoV interest messages for requesting FoVs of a 360 degree video. Table 610 may apply the naming scheme of table 600 and/or use the namespace for addressing (or referencnig) the FoVs (or tiles) depicted in FIGS. 3-4. A FoV Interest Message may request a particular FoV by calling the tiles that compose (e.g., display) the requested FoV. For example, if the FoV Interest Message requests a front FoV, the front tile 310 will be called for display as the FoV. In this case, the front FoV may represent a FoV for which a user is currently viewing.

In one example embodiment, and for purposes of discussion, a user device (e.g. user device 110) can transmit or send a current FoV Interest Messages Interest1-InterestN requesting a 360 degree video stream. As shown in table 610, a list of FoV tiles for a 360 degree video stream and associated FoV Interest Messages Interest1-InterestN at time instants T1-T3 are illustrated, where a tile at a corresponding time is found in each row. For example, at time T1, the FoV column indicates that the user (or device) has a viewpoint from a "Top" tile 340 that has a highest resolution, such as a UHD resolution, allowed by the network bandwidth. The FoV interest (Interest1) specifies the 360 video stream, using the namespace format discussed above, such that the name requested is "movie1" at "frame1" from the "top tile in UHD for "chunk1" during time instant T1.

While the current FoV may require an UHD resolution, FoVs surrounding the current FoV (in this case, top tile 340) at time instant T1 can be requested with a lower resolution. For example, the current FoV may require an optimum viewing experience, as it is typically desirable to have the highest resolution FoV in a viewer's current FoV, whereas other areas (currently not being viewed) can be lower resolution (until coming into view). For instance, as shown in table 610, at time instant T1, the bottom tile 350 of the video named "movie1" at "frame1" and "chunk1" is requested with lowest resolution SD using FoV Interest Message Interest2.

In another example embodiment, table 610 shows a FoV of "top" (top tile 340) by a user at time instant T2 of the 360 degree video stream. The time instant T2, as appreciated, follows time instant T1. Accordingly, any FoV Interest Message at time instant T2 occurs after any requested FoV Interest Message at time instant T1. As shown, the FoV is for "movie1" at "frame2" for "chunk1" and is to be fetched with the highest resolution (UHD) for viewing at time instant T2. Prior to time instant T2, the user was viewing the "top" tile 340 at time instant T1. Thus, at time instant T2, the user has not changed her FoV. As a result, as the 360 degree video stream continues to stream, the next frame (e.g., frame2) is retrieved for viewing. Additionally, and as described above, the FoVs surrounding the top tile 340 for time instant T2 can be requested at a lower resolution.

Similar requests may be made for other FoVs and time intervals as depicted. It is appreciated that the above described examples are non-limiting and that any number of time intervals, FoVs, movies, frames, resolutions, chunks, interest messages, etc. may be included.

Figures 7, 8:
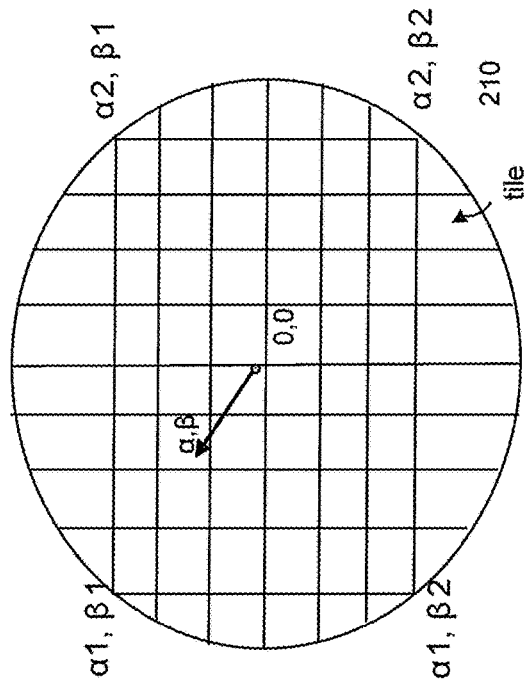
FIG. 7 illustrates an example of the tiles corresponding to areas around a center of a video stream.
FIG. 8 illustrates an example of a naming scheme for addressing tiles of FIG. 7.

FIG. 7 shows an example 360 degree video stream with multiple FoVs having tiles. The tiles (or FoV locations) are identified by an arrow pointing from the center at (0,0) to various locations (α,β). For example, in the depicted embodiment, the arrow may point to one or more of locations (α1,β1), (α2,β1), (α1,β2) and (α2,β2), which form a rectangle or square shaped area of the 360 degree video (e.g., a sequence of static frames) in FoVs 210, which defines a "tile" (area).

In embodiments, a namespace can be used to identify 360 degree videos streamed across a network. In one example, the namespace can be: /<video-id>/<frame-id>/<tile number>/<resolution>/<chunk-id>. The <video-id> may identify the name of the video, <frame-id> may identify a frame of the named 360 degree video, <tile number> may identify a tile or FoV for the frame of the 360 degree video, <resolution> may identify a resolution (e.g., number of pixels or amount of data) for the FoV of the 360 degree video, and <chunk-id> may identify the chunk or area portion of the FoV.

FIG. 8 illustrates an example of a namespace for addressing the tiles depicted in FIG. 7. Table 800 shows a namespace that identifies a 360 degree video stream movie (e.g., movieN), frame (e.g., frameN), tile (e.g., tileN), resolution (e.g., UHD, HD, SD, etc.), and chunks (e.g., chunkN) streaming in a network, such as ICN 102 (FIG. 1). Table 800 is similar to table 500, with the primary exception that any number of tiles "n" (as opposed to n=6 in FIG. 5) may be used to represent the 360 degree FoV.

Figures 9, 10:
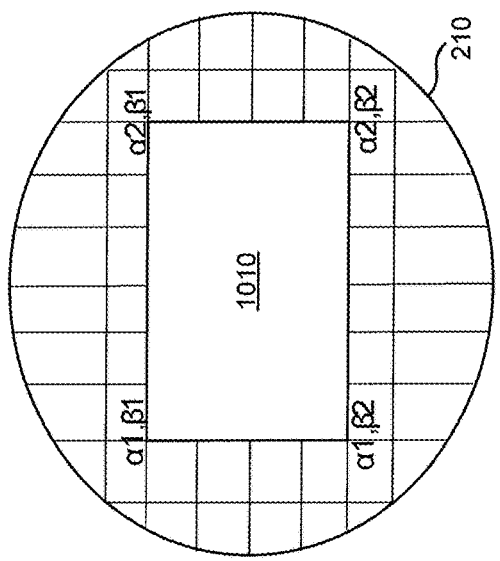
FIG. 9 shows example of FoV interest messages for requesting FoVs.
FIG. 10 illustrates an example of a desired FoV corresponding to areas around a center in a video stream.

FIG. 9 shows example of FoV Interest Messages for requesting FoVs of a 360 degree video. As shown, a FoV row includes a time (e.g., time instant (tn)), FoV (e.g., tiles 310, 320, 330, 340, 350 and 360) and one or more Interests (e.g., InterestN). As discussed above, the FoV column represents the current FoV of the user at a current time instant. In the example of table 900, a 360 degree video stream ("movie1") is requested by the user (or user device)

using FoV Interest Message Interest1, in which the first frame ("frame1") of the top view ("tile1") having a highest resolution ("UHD") and for chunk1.

Similarly, the FoV Interest messages Interest2 and InterestN may be requested for time instant T1. However, FoV Interest Messages Interest2 and InterestN request portions (e.g., "tile2" and "tileN") of the 360 degree video stream that "surrounds" the current FoV ("tile1"). Since "tile2" and "tileN" are not the current FoV, the FoV Interest Messages Interest2 and InterestN may be requested with lower level resolutions. For example, FoV Interest Message Interest2 requests a standard definition (SD) resolution, and FoV Interest Message InterestN requests a high definition (HD) resolution.

In another example embodiment, table 900 shows a FoV of "top" (top tile 340) by a user at time instant T2 of the 360 degree video stream. The time instant T2, as appreciated, follows time instant T1. Accordingly, any FoV Interest Message at time instant T2 occurs after any requested FoV Interest Message at time instant T1. As shown, the FoV is for "movie1" at "frame2" for "chunk1" and is to be fetched with the highest resolution (UHD) for viewing at time instant T2. Prior to time instant T2, the user was viewing the "top" tile 340 at time instant T1. Thus, at time instant T2, the user has not changed her FoV. As a result, as the 360 degree video stream continues to stream, the next frame (e.g., frame2) is retrieved for viewing. Additionally, and as described above, the FoVs surrounding the top tile 340 for time instant T2 can be requested at a lower resolution.

Similar requests may be made for other FoVs and time intervals as depicted. It is appreciated that the above described examples are non-limiting and that any number of time intervals, FoVs, movies, frames, resolutions, chunks, interest messages, etc. may be included.

FIG. 10 illustrates an example FoV in which multiple tiles are combined into a FoV Interest Message. As depicted, a FoV 1010 including multiple tiles has edges (corners) at coordinates $(\alpha1,\beta1)$, $(\alpha2,\beta1)$, $(\alpha1,\beta2)$ and $(\alpha2,\beta2)$. The corner locations $(\alpha1,\beta1)$, $(\alpha2,\beta1)$, $(\alpha1,\beta2)$ and $(\alpha2,\beta2)$ form the FoV 1010 of the 360 degree video stream of FoV 210. In one embodiment, the FoV 1010 may be a combination of multiple tiles that may be requested by the user device 110. In response to such a request, a FoV data message may include data or video for one or more tiles within the edge coordinates $(\alpha1,\beta1)$, $(\alpha2,\beta1)$, $(\alpha1,\beta2)$ and $(\alpha2,\beta2)$.

A 360 degree video stream may give the user the opportunity to select the requested FoV 1010 to be displayed at a given time instant. In one embodiment, a 360 degree view (or multiple FoVs) may be available to view for a period of time. The time period in which that the video is available may be, for example, an amount of time between the first 360 degree view of the video and the last 360 degree view of the video.

For example, while a user views video through a user device 110, such as an HMD, she may select a FoV that is different from the current FoV and available during a time instant that immediately follows the current FoV. A change in FoV may occur, for example, when a user changes her FoV, such as when wearing an HMD and moving or tilting her head in a different direction. When the FoV changes, the network sends updated data to the user device 110 to process the new FoV. However, if the network has insufficient bandwidth to provide the necessary data, the newly selected FoV will become degraded (e.g., a lower resolution will be sent to accommodate the available bandwidth), or in extreme circumstances, the network will not be able to send the requested data (new FoV) as a result of the limited bandwidth.

Figure 11:
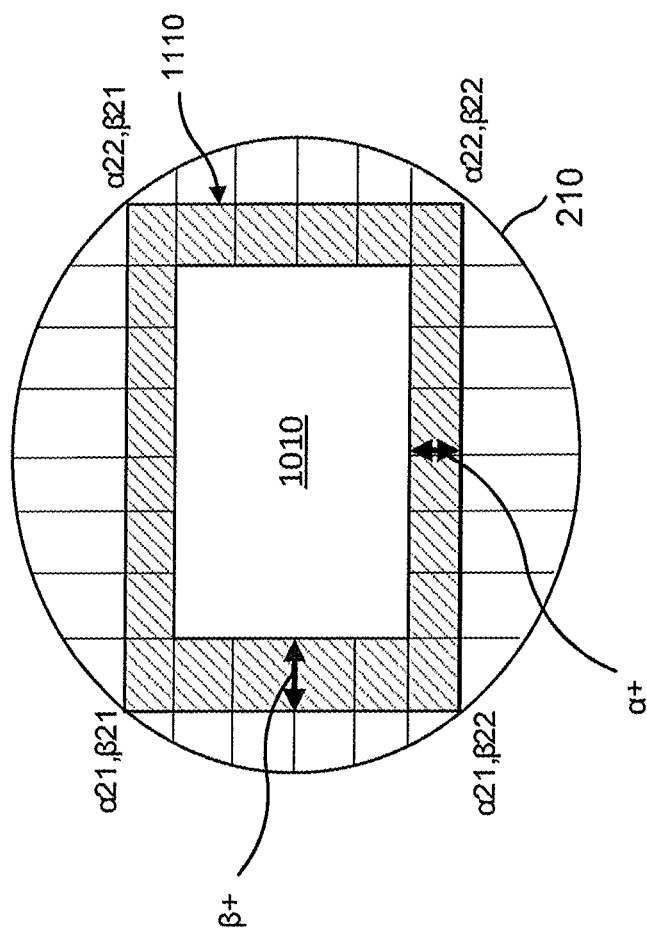
FIG. 11 illustrates an example of a future FoV corresponding to areas around a center in a video stream.

To reduce network strain, the user device 110 (or servers connected to the user devices) can predetermine the location(s) of future FoVs that the user will (or likely will) view during future time instants. Once the predetermination of the FoV location(s) has been made, the user device 110 (or server) may then prefetch the 360 degree video streams for the future FoVs prior to their display, for example in the HMD. In one embodiment, the predetermined location(s) of the future FoVs is determined using a margin (M) around the current FoV. The margin M may extend any width or length beyond the requested FoVs 1010 to form a future FoV 1110 defined by the coordinates $(\alpha21,\beta21)$, $(\alpha22,\beta21)$, $(\alpha21,\beta22)$ and $(\alpha22,\beta22)$, as illustrated in FIG. 11. In one embodiment, the margin M may be determined based on a variety of factors, as described below.

FIG. 11 shows a 360 degree video stream with a requested FoV and a future FoV. The requested FoV 1010 has an area that is smaller than an area of the future FoV 1110. However, network factors, such as network bandwidth and network RTT may impact how much larger the area of the future FoV 1110 is compared to the requested FoV 1010. For example, $\alpha+$ is an additional width added to front tile of current FoV 1010, and $\beta+$ is additional height added to front tile of current FoV 1010. In some instances, a determined future FoV 1110 of future time instants for a particular user as front tile of FoV 1010 with $\alpha+$ added as additional width and $\beta+$ added as additional height. In some cases, due to the direction of the motion, either additional width or height is added. In other cases, due to the direction of the motion, both additional width and height are added.

According to embodiments, it is possible to collect FoV Interest Messages from one user (e.g., a particular user) viewing the 360 degree video stream, to determine or calculate the amount of motion of the centers of FoVs from the current to the next FoV. This collecting may track the evolution of $(\alpha, \beta)$ centers of FoVs between consecutive FoV Interest Message. Based on the direction and amount of motion of the centers, the added $\alpha+$ of FoV 1010 and added $\beta+$ can be adjusted so that a determined future FoV, including the front tile of FoV 1010, added $\alpha+$ and added $\beta+$, may successfully predict and prefetch the future FoV. This future FoV 1110 may be successfully predicted and prefetched since the determined future FoV 1110 has the added width and height that overlaps or partially overlaps a future FoV 1110 the user will actually request after the next FoV.

The amount of $\alpha+$ and $\beta+$ added to FoV 1010 may depend on various factors. For example, when the RTT for messages between the user device 110 and the video producer is greater in length, the likelihood that additional data (e.g., FoV video) will be required increases. For instance, since a longer amount of time (RTT is longer) elapses between the user device 110 and the video producer, the likelihood that the user will change her FoV increases, resulting in the need for larger amounts of data to cover the changes in FoV. That is, more video is required in order to display the likely changes in FoV without significantly reducing the quality of the video. As appreciated, increasing the amount of video data requires an increase in bandwidth to maintain the same level or service. However, additional bandwidth is not always available and/or may result in other services being diminished.

In one embodiment, in order to accommodate the potential for additional data while addressing available resources, the predetermination of future FoVs 1110 requested by the user device includes location(s) with the additional height and weight. These future FoV 1110 location(s) may include tiles in any direction (from the viewpoint of the user), where the amount of change increases based on increases in the length of the RTT and decreases as the RTT shortens.

As an example, and with reference to the FoVs in FIGS. 10 and 11, the future FoV 1110 is larger in width ($\alpha+$) by an amount equal to $|(\alpha 21-\alpha 1)|+|(\alpha 22-\alpha 2)|$ and is larger in height ($\beta+$) by an amount equal to $|(\beta 21-\beta 1)|+|(\beta 22-\beta 2)|$. Accordingly, the area is defined by the coordinates of the current FoV 1010 and future FoV 1110. More specifically, and in one embodiment, an Fov Interenst Message may request the requested FoV 1010 with coordinates ($\alpha 1,\beta 2$)= (−60 degrees,−45 degrees) and ($\alpha 2,\beta 1$)=(60 degrees,45 degrees), whereas the future FoV 1110 may be requested with coordinates being ($\alpha 21,\beta 22$)=(−90 degrees,−60 degrees) and ($\alpha 22,\beta 21$)=(90 degrees,60 degrees). Accordingly, a larger FoV will become available to the user device 110. In one other example, and assuming a worst case scenario, the entire FoV for the 360 degree video stream may be requested. For example, the entire FoV 210 of the 360 degree frame may have coordinates ($\alpha 21,\beta 22$)=(−180 degrees,−90 degrees) and ($\alpha 22,\beta 21$)=(180 degrees,90 degrees).

It is appreciated that the estimation of the future positions of the center of the FoV may be achieved using other methods, such as interpolation using a parametrization of the previous k positions. For instance, knowing the position of the center at the k previous time instances, one can estimate p(k+1) using other estimators from estimation theory. In one instance, these interpolations and estimators can be used to calculate a motion between coordinate centers of each of the current FoV of one of the time instants and each of the next FoV of the next time instant.

Figure 12:
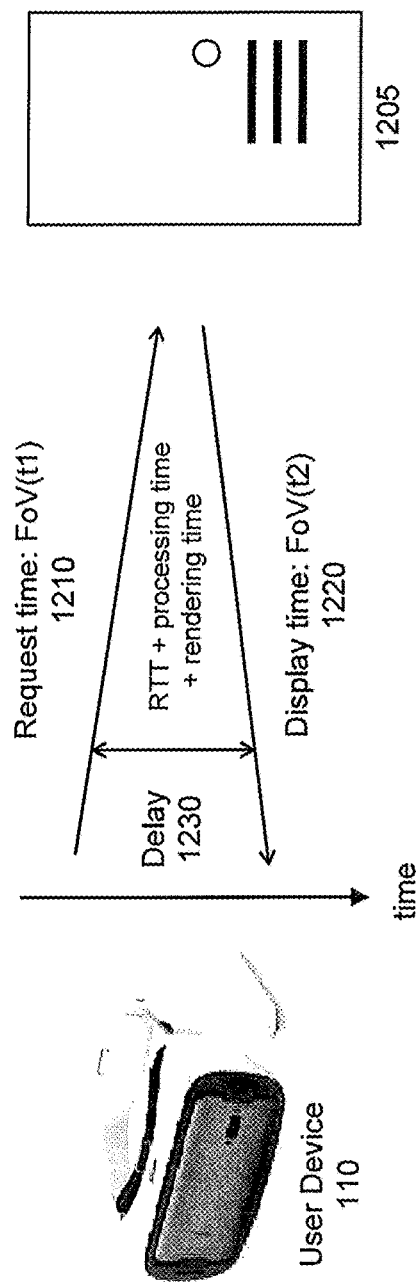
FIG. 12 illustrates an example of a bandwidth delay trade-off according to example embodiments.

FIG. 12 illustrates an example of FoV delay and bandwidth tradeoff between a user device and a producer. As illustrated, a communication may occur between a user device 110 and a server 1205, such as a producer of a 360 degree video over a period of time (t). FoV(t1) 1210 corresponds to the time at which the user device 110 requests an FoV and FoV(t2) 1220 corresponds to a time at which the requested FoV is displayed on the user device 110. In one embodiment, the time from which the FoV(t1) request is made until the Fov(t2) response is received may be referred to as the RTT. Moreover, in another embodiment, a delay 1230 can be measured as the RTT plus the amount of time taken to process and render the data at either the user device 110 and/or the server 1205.

In one embodiment, if it is assumed for purposes of discussion that there is no delay 1230 between FoV(t1) 1210 and FoV(t2) 1220, then the user device 110 can request the FoV and receive a response immediately (or nearly immediately) and without delay. Thus, a request for a FoV at time t1 would result in a response to the request at time t2, where t1=t2. In such as case, there would not be any increase in network bandwidth consumption or delay, while still providing a quality video experience to the user device 110. Under the circumstances in which there is no delay, there no need to predetermine, prefetch or predict future FoVs.

In another embodiment, if it is assumed for purposes of discussion that there is a delay 1230 between FoV(t1) 1210 and FoV(t2) 1220, then the requested FoV 1010 requested in a FoV Interest Message should include additional, future FoVs 1110 to account for the delay 1230. Otherwise, the quality of the video viewed by a user will likely be degraded. In this instance, when the user device 110 requests FoV at time instance t1, the returned data should include the requested FoV 1010 at time t1 (FoV(t1)) plus data to cover the delay 1230. This may be accomplished by prefetching a future FoV 1110 in which sufficient height and width are predetermined, as discussed above. However, there may be a tradeoff between the quality of the FoV versus the amount of delay in viewing the future FoV.

In another example, the delay 1230 may be measured or calculated by determining the RTT between the user device 110 and server 1205. As noted above, the RTT may also be measured by determining the processing time at the server 1205 and the rendering time at the user device 110. As in example above, the FoV 1010 may be requested at time t1 and includes added height and width that will cover future FoVs 1110. Accordingly, the data for that request at time t2=t1+delay 1230. Requesting a future FoV 1110 with enough added height and width to cover user behavior or head movement may nominally or minimally increase the network data bandwidth consumption without a delay to thereby provide a quality video experience for the user. In other words, the user will be satisfied by predetermining or predicting and prefetching future FoVs, the quality of the video for future FoVs will remain largely the same as the quality of the current FoV.

Figure 13:
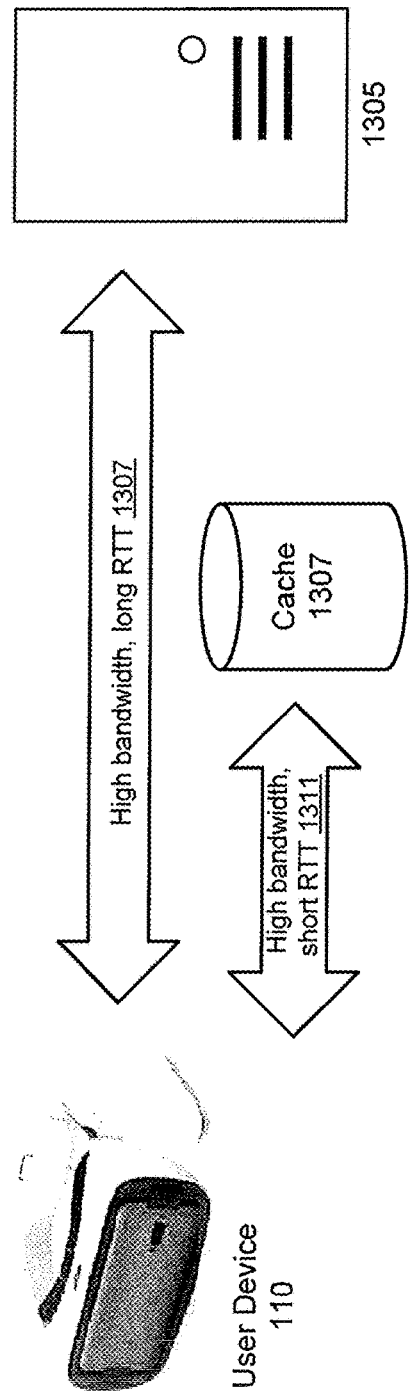
FIG. 13 illustrates an example of a bandwidth delay trade-off according to example embodiments.

FIG. 13 illustrates an example of a bandwidth delay tradeoff between a source device and edge router for determining a future FoV corresponding to areas around a center in the 360 degree video stream. In some embodiments, a network RTT for a user viewing the 360 degree video stream (e.g., at one time instant of the 360 degree video stream) may vary based on the entity that responds—e.g., response data message received from a source (producer) or an edge router in the network. The example of FIG. 13 is similar to the example of FIG. 12, except that the data message in response to the FoV Interest Message is provided by a cache 1307 which is, for example, located between the user device 110 and the server 1305 in an edge router (not shown) of the network.

For example, data requests and responses between a user device 110 and a server 1205 has a high bandwidth and long RTT 1307. Accordingly, when the server 1205 responds to a FoV Interest Message from the user device 110 there is significant delay. On the other hand, when data responses are received from a cache 1307 located, for example, in an edge router located in between the user device 110 and the server 1205, the high bandwidth remains on the same path, but the RTT is shorter (1311). Accordingly, the cache takes significantly less time to respond to a FoV Interest Message from the user device 110, resulting is less delay or RTT. Thus, caching response data messages at edge routers (or any node in between the user device and server) will decrease delay while marinating bandwidth. In one embodiment, this allows a future FoV to be prefetched with an increased size and higher resolution and may satisfy changes in FoV location caused by the movement of the user's head.

Figure 14:
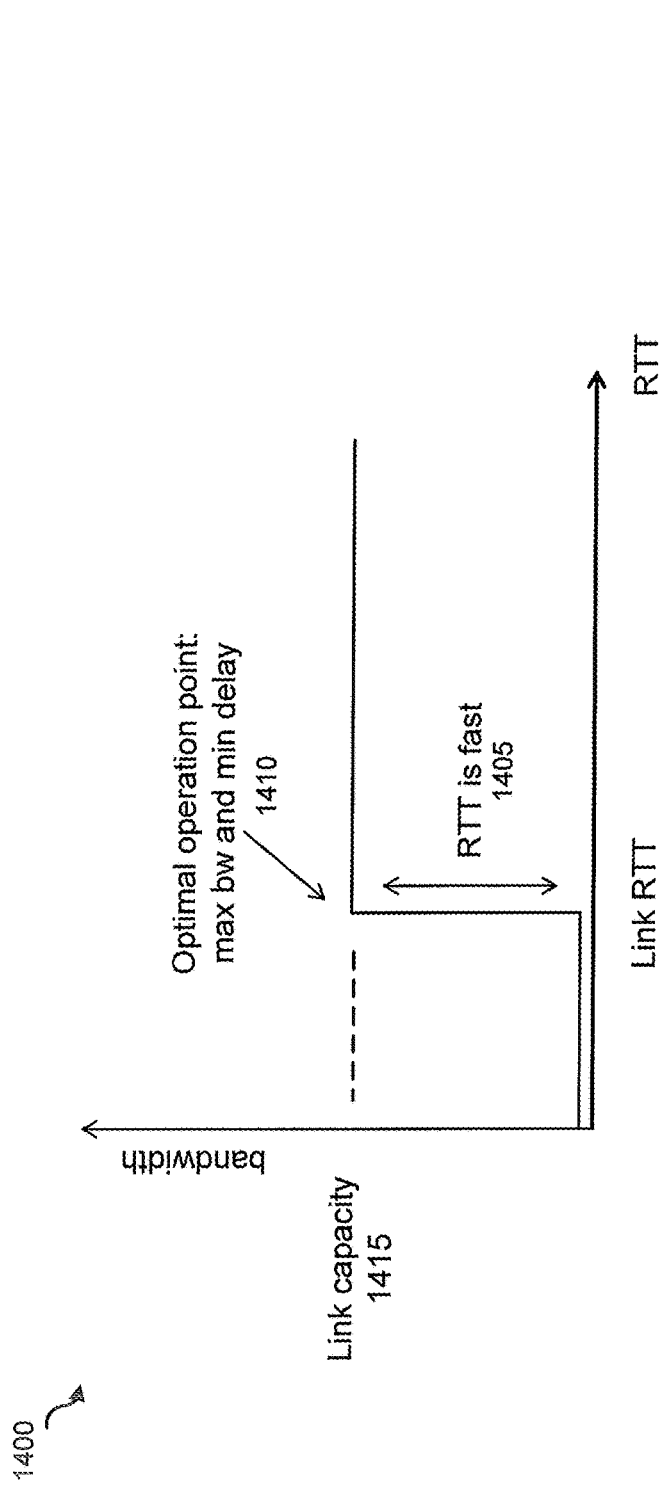
FIG. 14 illustrates an example of a chart plotting available network data bandwidth.

FIG. 14 illustrates an example chart plotting bandwidth against RTT for a network link between a user device and the source according to example embodiments. Once the size (height and width) of the future FoV 1110 to be requested by the user device 110 has been determined, the actual amount of data or "highness" of the resolution of the data can be determined based on the network bandwidth.

Chart 1400 plots an optimal operation point 1410 at a link capacity 1415 of available bandwidth for a specific link RTT 1405. The optimal operation point 1410 may be, for example, where the measured RTT 1405 and the maximum available bandwidth occurs for a user device 110. RTT 1405 may be the measured RTT between a user device 110 and the source of the data, such as server 1205. In one embodiment, the RTT is in a region where RTT is shortest. For example, the y-axis plots a range of bandwidth (bw) between zero and the link capacity 1415 for the network, such as a maximum available bandwidth for sending data with RTT 1405 before having to buffer data to satisfy the request. In one embodiment, the RTT for the future FoV can be predicted based on a prior measured RTT for a prior FoV request of the user device 110.

In one embodiment, optimal operation point 1410 is a target where the maximum bandwidth or link capacity 1415 occurs independent of the amount of data or "highness" of the resolution of the data for the requested future FoV 1110, where the amount of data requested does not exceed the available bandwidth of the link capacity 1415. For example, during the minimum RTT for requesting the future FoV, the network will have a maximum available link capacity 1415 for sending data before it becomes necessary to buffer data to satisfy the request (the amount of data to transfer beings to exceed the bandwidth). In one embodiment, the maximum bandwidth may be predicted based on previously measured bandwidth for previously requested FoVs. Thus, the optimal operation point 1410 may be determined by the available data bandwidth between the user device 110 and the server 1205 as a measured maximum link capacity available bandwidth during a minimum measured RTT 1405 between the user device 110 and server 1205 for a prior FoV Interest Message and response data message.

In this case, the bandwidth consumed or used by the response data message does not impact RTT 1405 or the delay 1230 as long as that bandwidth does not exceed (e.g., fill) the link capacity 1415. Accordingly, the amount of data requested by the user device 110 in the future FoV 1110 may be increased in size until the size consumes or (or fills) the maximum available bandwidth of the link capacity of optimal operation point 1410.

Figure 15:
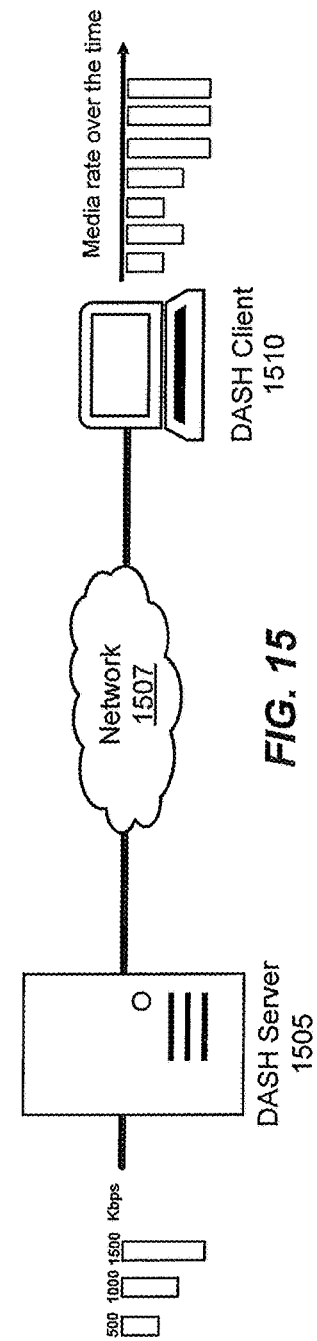
FIG. 15 illustrates an example of measuring available network bandwidth against available network RTT for a network link.

FIG. 15 illustrates an example of a network using dynamic adaptive streaming over HTTP (DASH). DASH allows media (e.g., a Television (TV) show, movie, or video clip) to be broken into multiple segments. Each segment is made available in multiple different representations. Each representation of a segment includes the same media content but a different encoding format (e.g., different resolution, different encoding bitrate, different compression ratio, etc.). The segments of the media and the corresponding representations of the segments are presented to a DASH compliant client (e.g., DASH client 1510) in a manifest, which is referred to as a Media Presentation Description (MPD) document. When streaming the media, the DASH client automatically selects a desired representation for a next segment of the media to download and play from the available representations of the next segment. Thus, the selected representation of the next segment is automatically selected so that the DASH client is able to (a) download the segment in time for playback without causing stalls or re-buffering events in the playback and (b) render the media content of the downloaded segment.

Applying the DASH protocol, available bandwidth may be measured against available RTT for a network link between the DASH client 1510 and the source of the media (e.g., source device or edge server), such as DASH server 1505. As illustrated, DASH server 1505 has varying bandwidth rates such as 500, 1000 and 1500 Kbps and is connected to network 1507, such as the Internet. Network 1507 may also be connected to a DASH client 1510 that receives media at varying rates over time. In one embodiment, the DASH server 1505 and DASH client 1510 are computer devices that are DASH compliant. In another embodiment, the DASH server 1505 is a source of a 360 degree video stream and the media rate over time is the RTT, such as RTT 1405 (FIG. 14) at which the DASH client 1510 is receiving data messages in response to FoV Interest Messages sent at various time instants during the video stream.

For example, the DASH client 1510 may send a request for data, receive the data and compute the network rate based upon the time taken to receive the data. Based upon the measured throughput, the DASH client 1510 can adapt the rate accordingly. Adapting the rate may include, for example, measuring the size of an amount of data of a future FoV. In another example, the DASH client 1510 may measure optimal operation point 1410 at a link capacity bandwidth for a certain link RTT 1405 (FIG. 14), which determine the media rate over time.

In one embodiment, the DASH client 1510 measures the RTT, such as RTT 1405, for each of the data and interest message pairs. This may also be used to help predict the RTT for the future FoV based on a prior measured RTT for a prior FoV request of the DASH client 1510.

In one other embodiment, the client device 1510 may begin by issuing a request for a future FoV (FoV 1110) at a particular data rate and which is based upon a starting view angle or FoV). The client device 1510 begins by measuring the bandwidth (e.g., data throughput or link capacity) and RTT. In a first example, we assume the RTT is short, such as video streamed from a local node, CDN, or local cache. In this case, if a FoV changes during the RTT, the network can respond without sacrificing video quality, as described above. In a second example, we assume the RTT long, such as video streamed from a remote server. In this case, the network response will be delayed given the long RTT. Thus, if the FoV changes during the long RTT, the quality of the video streamed to the user will be perceived as lacking quality (e.g., a lag may appear in the video being watched). In this case, the size (i.e., width and height) of the future FoV may be increased, as explained above.

Figure 16:
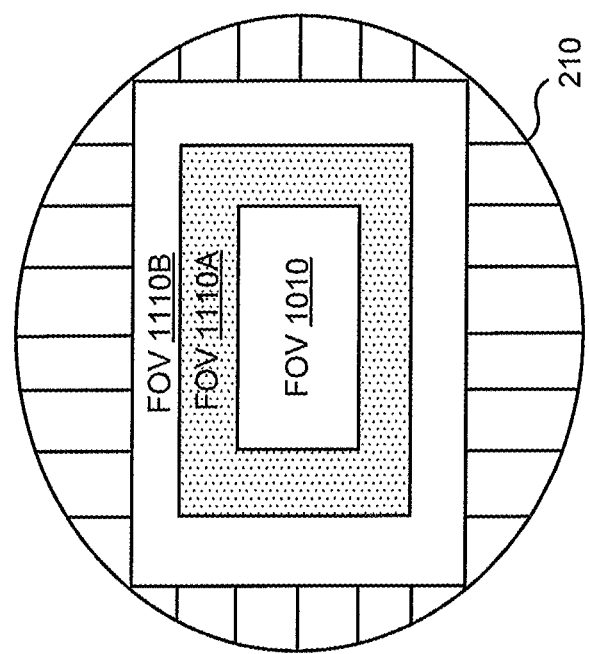
FIG. 16 illustrates an example of possible determined future FoVs corresponding to areas around a center in a video stream.

FIG. 16 illustrates an example of a requested FoV and future FoVs. As depicted, a 360 degree video stream includes requested FoV 1010 and future FoVs 1110A and 1110B, each of which have corner locations which form a rectangle or square shaped area of a frame at a time instant in FoV 210. It is appreciated that future FoV 1110A has a larger height and width than FoV 1010, and future FoV 1110B has a larger height and width than future FoV 1110A.

In one embodiment, the requested FoV 1010 is based upon the RTT (i.e. FoV size depends on the RTT) and the rate is adapted based upon bandwidth (i.e. the quality of the FoV depends on the bandwidth).

In the first instance, the FoV is adapted based on the RTT. For example, when RTT is large (e.g., 100 ms), the size (height and width) of the requested FoV may exceed the size of the display. In one embodiment, the requested FoV exceeds the size of the display, but is no larger than any motion of the user with the RTT. For instance, the future FoV 1110B may be selected to have a total area that is twice the display size area as the area of FoV 1010. Where the RTT is very short (e.g., <20 ms), then the requested FoV may equal the display size or be marginally larger than the display size. Where the RTT is in between set thresholds (e.g., 20 ms>RTT>100 ms), the size of the requested FoV can be increased using a monotonically increasing function that goes from the short RTT size for RTT<20 ms to the large RTT size for RTT>100 ms. In one other embodiment, the increase may be a linear increase between 20 ms and 100 ms.

Figure 17:
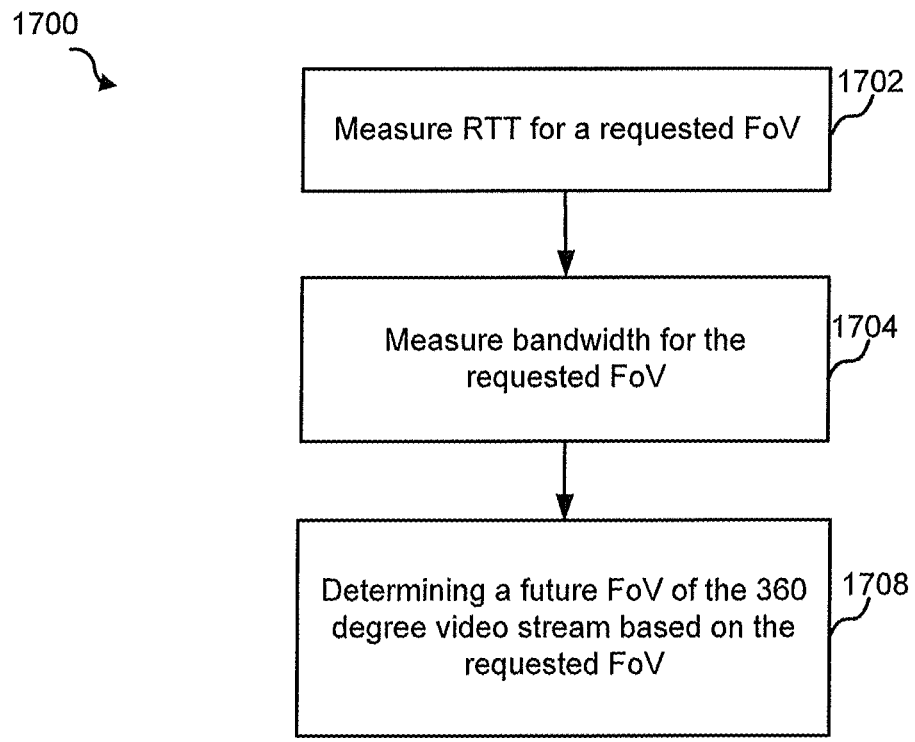
FIG. 17 is a flow diagram of a process for determining a future FoV for a video stream.

In the second instance, and based upon the size of the FoV determined in the first instance, the proper data rate is determined using the measured bandwidth, such that the next chunk of data is downloaded within the proper delay time FIG. 17 is a flow diagram for determining a future FoV of a 360 degree video stream. Process 1700 may be a process that includes determining a size and data rate of a future FoV (e.g., FoV 1110, 1110A and/or FoV 1110B), which may be performed by one of the nodes or components of FIGS. 1, 12, 13, 15, 20A, 20B, 21 and 22.

Process 1700 begins at 1702 where the RTT for a client device 110 viewing the 360 degree video stream is measured.

At 1704, a bandwidth for the requested FoV of the 360 degree video stream is measured. In one embodiment, the measured bandwidth may be a maximum amount of data the network is capable of transmitting in the response data message to the requested FoV Interest Message.

At 1708, a future FoV is determined for the client device 110 viewing the 360 degree video stream based on the requested FoV, the measured bandwidth and the measured network RTT. In one embodiment, process 1708 includes selecting a size of the future FoV based on a size of the requested FoV 1010 and the measured RTT. In another embodiment, process 1708 includes selecting an amount of data of the future FoV based on the requested FoV, the selected size of the future FoV and the measured bandwidth.

Figure 18:
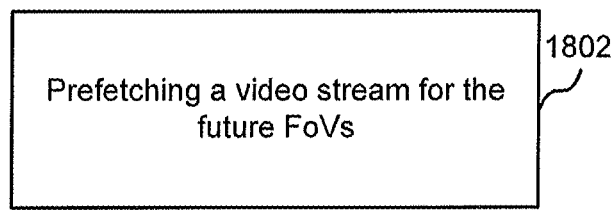
FIG. 18 is a flow diagram of a process for prefetching a video stream.

After the future FoV size and data size are determined, the video stream for the determined size and data rate can be prefetched at the current time in a FoV Interest Message sent to the source of the video stream, as shown in FIG. 18. For example, process 1802 begins by prefetching 360 degree video stream for the future FoV (e.g., of the future time instant). The prefetch may be prior to the future time instant for the user viewing the 360 degree video stream. Process 1802 may include prefetching a video stream for a determined size and data rate future FoV (e.g., FoV 1110, 1110A and/or FoV 11106, and may also occur after determining the future FoV at 1708 of FIG. 17.

Figure 19:
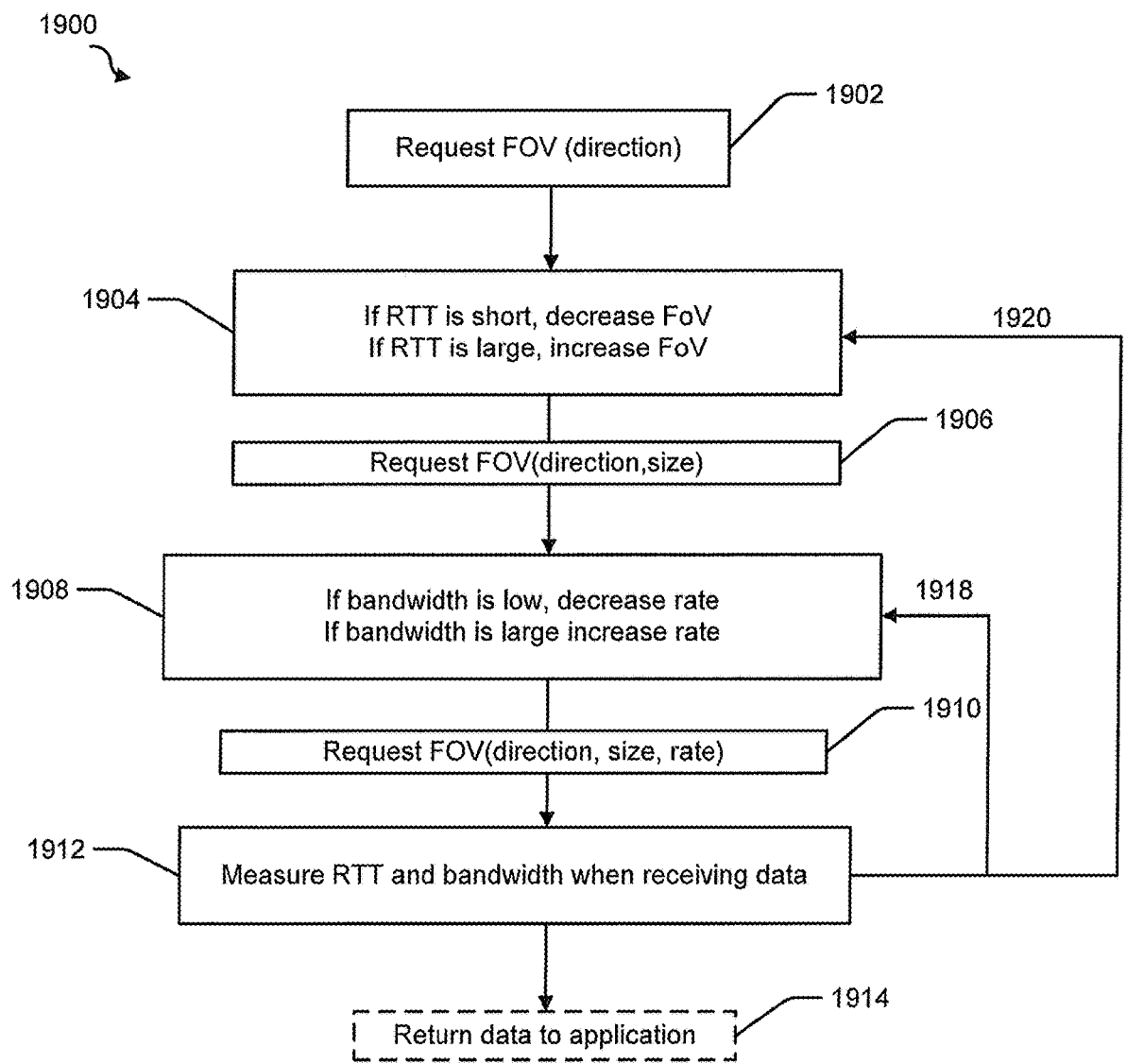
FIG. 19 is a flow diagram of a process for determining and prefetching a video stream for a future FoV.

FIG. 19 illustrates a flow diagram of a FoV and Rate adaptation methodology. Process 1900 may be a process that includes repeatedly determining a size and data rate of a future FoV and/or repeatedly prefetching a 360 degree video stream for the future FoV. In the embodiment described below, the process 1900 is performed by a node, such as client device 110 or router 106. However, it is appreciated that any component as described herein may implement the process.

At 1902, a FoV for a specified direction is determined or requested by a user. For example, a user device 110 may request a set of tiles around a center $(\alpha,\beta)$ in spherical coordinates.

At 1904, the size of the requested FoV is decreased if the network RTT is short and increased if the network RTT is large. The RTT may be predicted or measured, as described above in 1702. In one embodiment, the size of the future FoV is selected based on the requested FoV 1010 and the measured RTT. In another embodiment, a version of the requested FoV 1010 is created with the selected (e.g., changed) size by (1) adding an amount of height and width to the requested FoV 1010 based on an amount that the measured RTT is greater than a threshold (e.g., prior) RTT, or (2) subtracting an amount of height and width from the height and width of the requested FoV based on an amount that the measured RTT is less than the threshold RTT.

At 1906, a FoV for a specified direction and size is determined. For example, the direction requested in 1902 and the size as determined in 1904. Based on the size of the FoV, the proper data rate will be selected based on measured network bandwidth, such that the next chunk of data may be downloaded within the delay. For example, the data rate of the requested FoV is decreased if the network data bandwidth is low, and increased if the network data bandwidth is large, at 1908. The network data bandwidth may be predicted or measured as described above in 1704. In one embodiment, an amount of data of the future FoV is selected based on the requested FoV 1010, the selected size of the future FoV and the measured network data bandwidth.

In one embodiment the determined future FoV includes the requested FoV 1010 having the selected size as determined at 1904, and selecting the amount of data of the future FoV at 1908 includes (1) adding an amount of data to the future FoV based on an amount that the measured network data bandwidth is greater than a threshold network data bandwidth, or (2) subtracting an amount of data from the future FoV based on an amount that the measured network data bandwidth is less than the threshold network data bandwidth. In this case, the threshold network data bandwidth may be an amount of data bandwidth for sending data to satisfy the requested FoV having the selected size, at a link capacity of the network during the measured RTT.

At 1910, the determined future FoV at 1908 is requested with the determined direction, size and data rate. The direction may be, for example, the requested FoV 1010 direction around a center $(\alpha,\beta)$. The size may be, for example, the size determined at 1904, and the data rate may be the data rate or amount of data determined at 1908. In one embodiment, at 1910, a 360 degree video stream may be prefetched for the future FoV (e.g., of the future time instant determined at 1908). This prefetch may occur prior to the future time instant for the user viewing the 360 degree video stream. In another embodiment, at 1910, a 360 degree video stream may be prefetched for a size and data rate determined for the future FoV as described at 1802.

At 1912, the network RTT and data bandwidth are measured when the data message is received in response to the request for the determined future FoV at 1910. Here, a 360 degree video stream may be received for the future FoV of the future time instant prior to the future time instant for the user viewing the 360 degree video stream, as described in 1802. The network RTT and data bandwidth may also be predicted as described at 1702 and 1704.

At 1918, the network data bandwidth is updated to reflect the measured RTT at 1912.

At 1920, the network RTT is updated such that the RTT used at step 1904 is the RTT measured at step 1912.

Optionally, at 1914, the data from the data message is returned to the user device 110 for 360 degree video rendering.

Figure 20A:
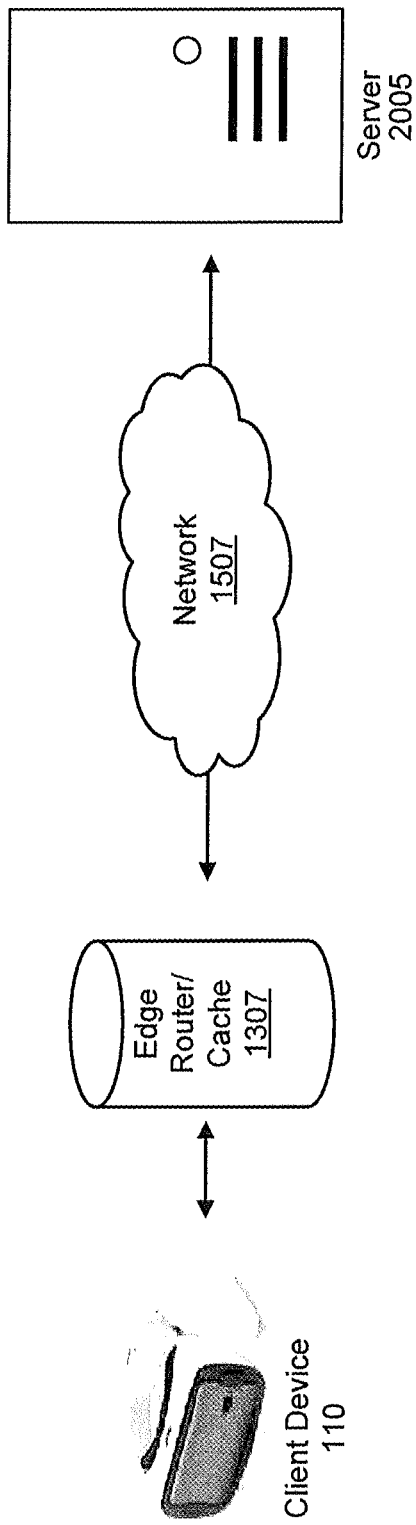
FIG. 20A illustrates an example of a network assisted process for determining a size and data rate of a future FoV.

FIG. 20A illustrates an example of a network assisted adaptation according to one embodiment. The network assisted adaption implements the processes described in FIGS. 17, 18 and 19 using an "adaptation" function at an edge router/cache 1307. The edge router/cache 1307 is located, as illustrated, in between user device 110 and server 2005, which may be the source of video. Network 1507, as described above, may represent the Internet or another type of network, or be part of network 102, and communicatively couples the edge router/cache 1307 and the server 2005. In the disclosed embodiment, an edge router/cache 1307 (e.g., instead of the user device 110) may measure or predict the network RTT and bandwidth, and based on the measurements and the current FoV request received at the edge router/cache 1307, determine the future FoV and/or prefetch a video stream for the future FoV. In this case, from the perspective of the user device 110, the source of the video may appear as the edge router/cache 1307 instead of the server 2005.

When the network 1507 is an ICN, the edge router/cache 1307 can measure the RTT using the PIT 120 entry (e.g., see FIG. 1A). The RTT may be the amount of time that occurs between setting an entry (e.g. an interest message) in the PIT 120 until the entry is removed from the PIT 120. For example, the RTT may be the time between receipt of an interest message by the edge router/cache 1307 from the user device 110 and receipt of the data message responding to the interest message the edge router/cache 1307 from the server 2005. In one embodiment, the time measurement at the edge router/cache 1307 may be combined with a known scheduling method "over the air" or between the user device 110 and the edge router/cache 1307 to calculate the measured RTT between the user device 110 and the server 2005 or delay 1230

In one embodiment, where the network 1507 is an ICN, the edge router/cache 1307 can measure the bandwidth using the PIT 120 entry. For example, the bandwidth may be based on an estimated bandwidth or may be the number of bits transmitted in the interest message and/or data message during the measured RTT (e.g., measured using the PIT entry).

Once the RTT and bandwidth have been determined, the edge router/cache 1307 can implement the adaptation function. The adaptation function may also be based on a proper naming scheme or semantics that expose the FoV at the network layer. Here, the edge router/cache 1307 can determine the future FoV based on the measured RTT and bandwidth from the PIT entry and a current FoV Interest Message having a requested FoV 1010 received from the router/cache 1307 via the user device 110, and/or prefetch a 360 degree video stream for that future FoV.

In one embodiment, the edge router/cache 1307 can determine a size and data rate of a future FoV similar to that described in FIGS. 11-16, at 1708 in FIG. 17 and/or at 1904-1908 in FIG. 19, except that the determination is performed at the edge router/cache 1307 based on the network RTT and bandwidth measured using the PIT entry and the requested FoV 1010 received from that the edge router/cache 1307 via the user device, as opposed to being based on the RTT and bandwidth measured at the user device 110 and the requested FoV 1010 at the user device 110.

The edge router/cache 1307 may also prefetch a 360 degree video stream for the determined future FoV from the server 1305 (FIG. 13). This may include prefetching a 360 degree video stream for the future FoV In the embodiment, the edge router/cache 1307 prefetching the 360 degree video stream for the future FoV may be similar to that described in FIGS. 11-16, at 1802 in FIG. 18 and/or at 1904-1908 in FIG. 19, except that the prefetching is performed by the edge router/cache 1307 (e.g., sending an interest to the server of the video) based on the future FoV determined at the edge router/cache 1307, as opposed to being performed by the user device 110 based on the future FoV determined at the user device 110.

In another embodiment, after the edge router prefetches the 360 degree video stream for the future FoV, it may transmit the 360 degree video stream data message received from the server 2005 to the user device 110. Thus, in response to sending a FoV Interest Message to the server (producer) for requested FoV 1010, the user device 110 will receive data for the determined future FoV of the 360 degree video stream. The user device 110 receiving the data in response to having or requesting a requested FoV 1010 may be similar to that described in FIGS. 11-16, at 1802 in FIG. 18 and/or at 1912-19148 in FIG. 19.

In another embodiment, after the edge router/cache 1307 prefetches the 360 degree video stream for the future FoV, it may cache the 360 degree video stream data received in the data message from the server 2005 (producer) for later transmission to the user device 110. Thus, in response to sending an additional interest message to the server 2005 for a FoV including data that was in the determined future FoV, the user device 110 will receive that data from the edge router/cache 1307.

In some embodiments, instead of having separate resolution data (e.g., data rate, amount of data or quality of data) for each FoV, tile or chunk, a resolution layered approach may be employed. For example, instead of sending resolutions UHD, HD or SD for each FoV, tile or chunk as in FIGS. 3-10, a base resolution layer for each FoV, tile or chunk may be sent, and one or more enhancement resolution layers may also be sent that increase the base resolution for any desired FoV, tile or chunk to a higher resolution. For example, FIG. 20B illustrates an example network using a base layer capability to provide streaming video data in response to requests for determined future FoVs, according to example embodiments.

Figure 20B:
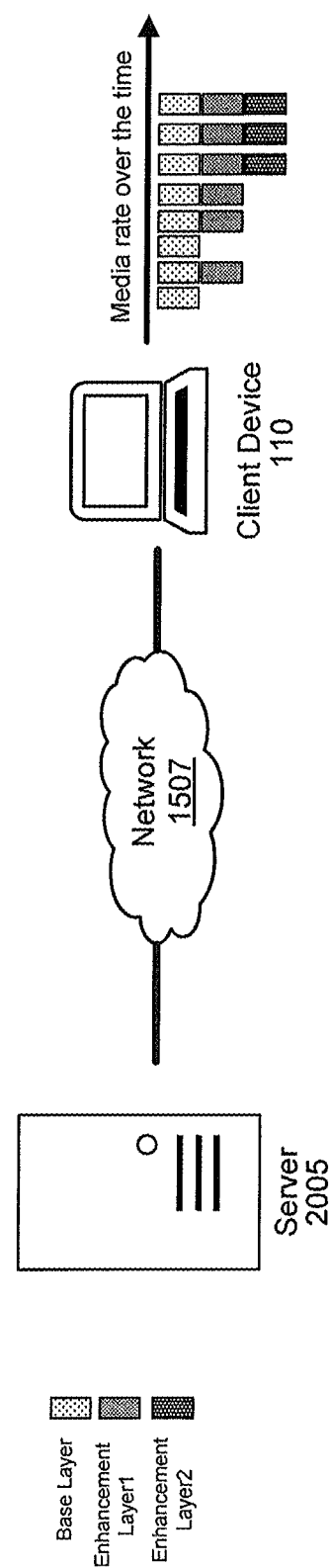
FIG. 20B illustrates an example of a network using a base layer capability to provide streaming video data.

In the example of FIG. 20B, instead of sending resolutions UHD, HD or SD for each FoV, tile or chunk, a base resolution layer (shown by the lightest shaded boxes) is sent from the server 2005 (e.g., producer) to the user device 110 for each FoV, tile or chunk during the time instances or media rate over time of the 360 degree video stream. In one instance, the base layer may satisfy the SD resolution standard. In another embodiment, a first enhancement resolution layer (shown by the medium shaded boxes) is sent from the server 2005 to the user device 110 that increases the resolution from the base resolution to a first enhanced resolution for any FoV, tile or chunk. In one instance, the first enhancement resolution layer may increase the resolution from SD to satisfy the HD resolution standard.

Likewise, a second enhancement resolution layer (shown by the heaviest shaded boxes) may be send from the server 2005 to the user device 110 that increases the resolution from the first enhanced resolution to a second enhanced resolution for any FoV, tile or chunk. In one instance, the second enhancement resolution layer may increase the resolution from HD to satisfy the UHD resolution standard.

It can be appreciated that the first enhancement layer alone would not provide the first enhanced resolution without the base layer. Rather, the first enhancement later would be combined with the base layer to provide the enhanced resolution. Similarly, the second enhancement layer alone would not provide the second enhanced resolution without the base layer and the first enhancement layer. Rather, the second enhancement later would be combined with the base layer and the first enhancement layer to provide the enhanced resolution.

In one embodiment, all of the FoVs, tiles or chunks will receive the base enhancement layer. The determined data rate or amount of data for the determined future FoV can then be used to determine which FoVs, tiles or chunks will receive the first enhancement layer and/or the second enhancement layer.

As previously discussed, reducing bandwidth consumption in a network that is streaming a 360 degree has several advantages. Embodiments described herein can reduce overall network bandwidth by prefetching or caching (e.g., video streams) determined future FoVs of future time instants for a particular user viewing the 360 degree video. For example, FIGS. 11-20B provide examples where based upon network RTT and bandwidth, 360 degree video streams for a determined future FoV can be requested ahead of time (e.g., prior to knowing what it will be based on user behavior), while the previous 360 degree video stream is still in the playback buffer of the user device. In some instances, such prefetching or caching improves quality of experience of the user's viewing of the video since the determined future FoV selected has higher resolution than the rest of the views.

Figure 21:
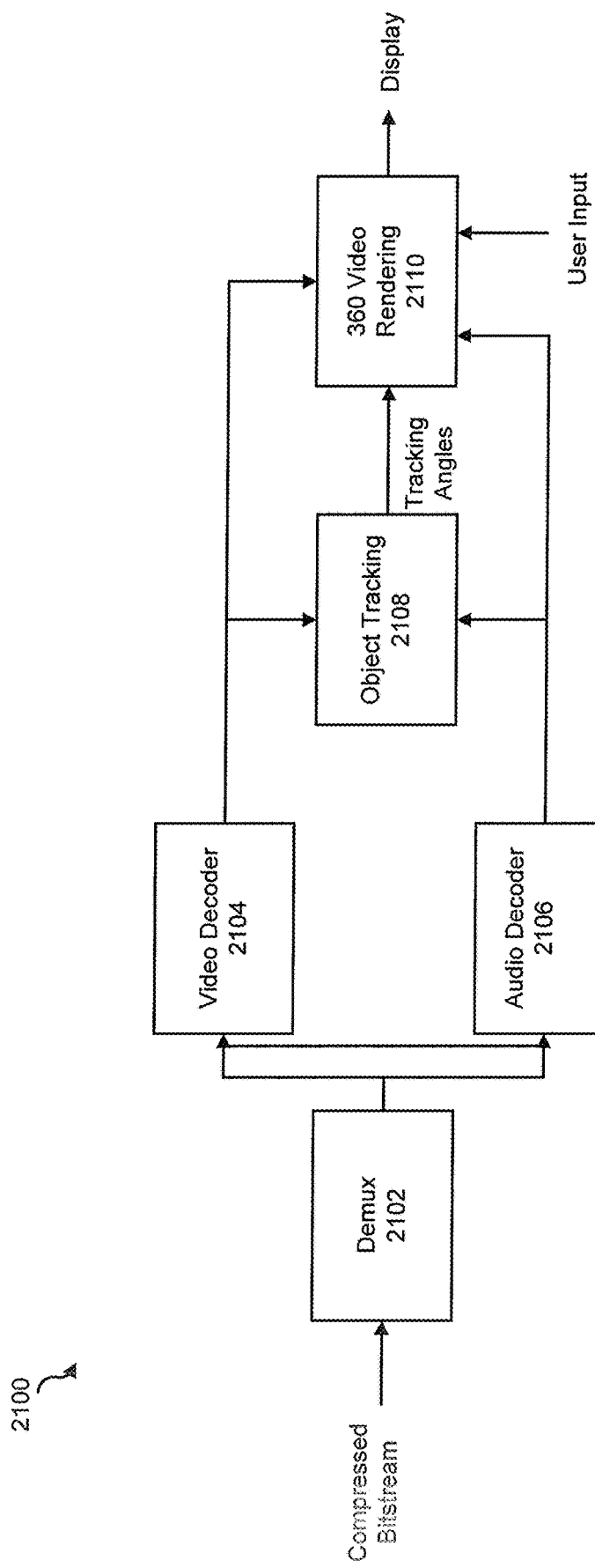
FIG. 21 illustrates a 360 degree rendering system using object tracking.

FIG. 21 illustrates a 360 degree rendering system using object tracking. A compressed bitstream (e.g., the 360 degree video stream) is received at a demultiplexer 2102 as input and demultiplexed into respective streams of data (e.g., video stream, audio stream). In this example, the demultiplexed bitstream may be received by respective decoders on separate channels. For example, the video stream portion of the compressed bitstream may be received and decoded by a video decoder 2104, and the audio stream portion may be received and decoded by an audio decoder 2106. An object tracking device 2108 may receive both the video and audio streams from the decoders 2104 and 2106, respectively, and track one or more objects in the decoded 360 degree video stream. The object tracking device 2108 may provide one or more tracking angles associated with the one or more objects to the video rendering device 2110. In some aspects, the object tracking device 2108 may detect objects that are closest to the center of a current view. In other aspects, the object tracking device 2108 may lock onto an object based on the user selecting the object on display in the scene via an input device (e.g., mouse).

The video rendering device 2210 receives the decoded video stream and decoded audio stream as input and renders the decoded stream for display. The video rendering device 2210 also receives the tracking angles from the object tracking device 2214 as input. The video rendering device 2210 also receives a user input that includes one or more view angles defined by a user through a user input device (e.g. mouse, remote control, etc. . . . ). In one embodiment, the user input also includes one or more user-selected field of view angles. In this respect, the video rendering device 2210 may select between the tracking angles and the user-selected view angles for rendering the decoded video stream. The object tracking device 2108 may accept different forms of user input to initiate the tracking of objects in a scene including, but not limited to, user eye movement data, user head movement data, voice recognition data, and the like.

In embodiment, the video rendering device 2110 may receive a set of user-selected view angles as input. The video rendering device 2110 may select between the set of user-selected view angles and tracking angles from the object tracking device 2108. The video rendering device 2110 may render one or more video sequences of the decoded 360 degree video stream with one or more view angles from the set of user-selected view angles when the set of user-selected view angles is selected over the tracking angles. In one embodiment, the one or more video sequences are rendered back with one or more suggested tracking angles after a predetermined period of time of user inactivity.

Figure 22:
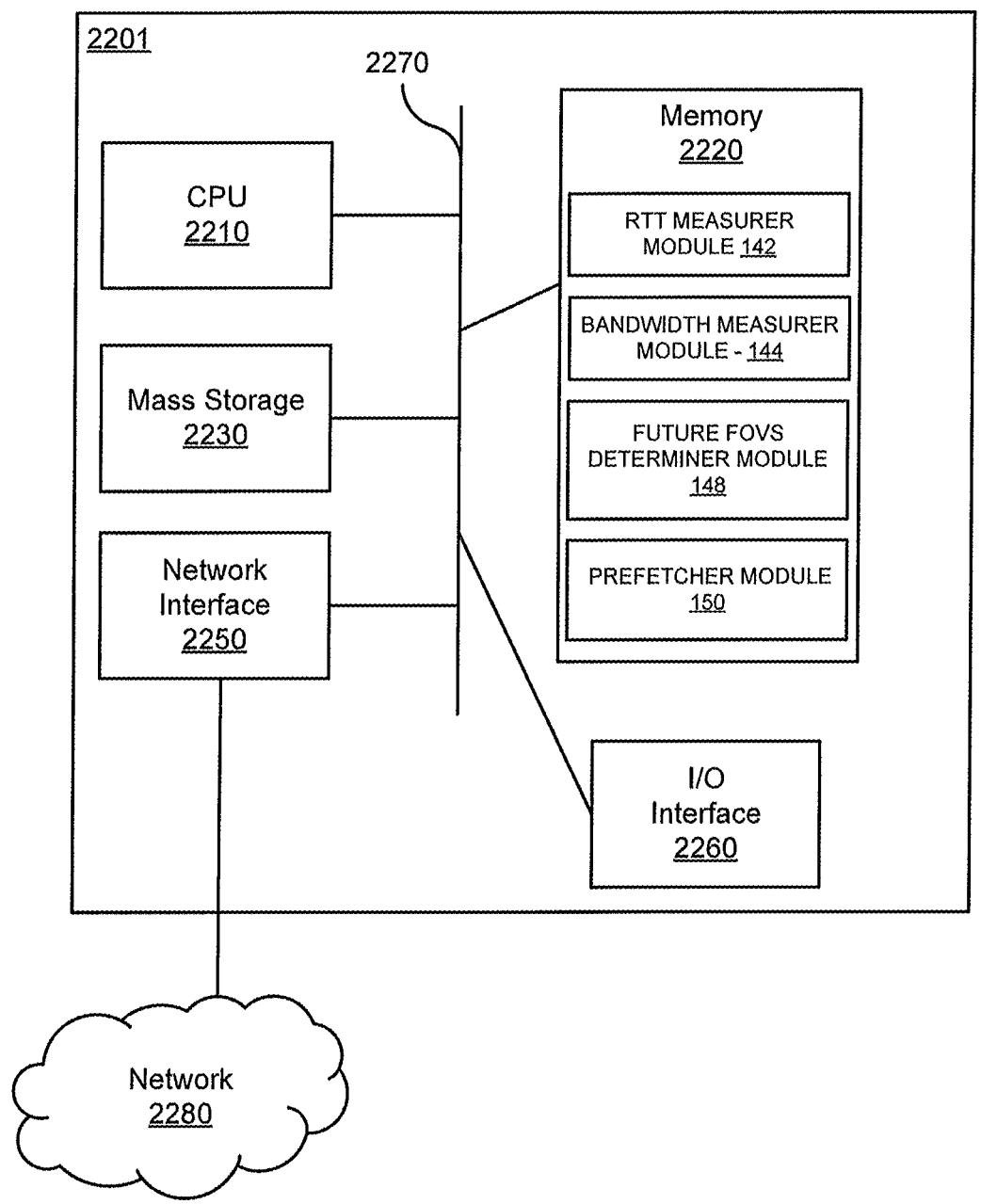
FIG. 22 is a block diagram of a network system that can be used to implement various embodiments.

FIG. 22 is a block diagram of a device that can be used to implement various embodiments. Specific devices may utilize all of the components shown, or a subset of the components, and levels of integration may vary from device to device. Furthermore, the device 2200 may contain multiple instances of a component, such as multiple processing units, processors, memories, transmitters, receivers, etc. The device 2200 may comprise a processing unit 2201 equipped with one or more input/output devices, such as network interfaces, storage interfaces, and the like. The processing unit 2201 may include a central processing unit (CPU) 2210, a memory 2200, a mass storage device 2230, and an I/O interface 2260 connected to a bus 2270. The bus 2270 may be one or more of any type of several bus architectures including a memory bus or memory controller, a peripheral bus or the like.

The CPU 2210 may comprise any type of electronic data processor. The memory 2200 may comprise any type of system memory such as static random access memory (SRAM), dynamic random access memory (DRAM), synchronous DRAM (SDRAM), read-only memory (ROM), a combination thereof, or the like. In an embodiment, the memory 2200 may include ROM for use at boot-up, and DRAM for program and data storage for use while executing programs. In embodiments, the memory 2200 is non-transitory.

In some embodiments, the memory 2200 includes a RTT measurer module 142 for measuring a network round trip time for a user viewing the 360 degree video stream (e.g., at one time instant of the 360 degree video stream, a bandwidth measurer module 144 for measuring a network data bandwidth for the requested FoV of the (e.g., for the user viewing the) 360 degree video stream, a future FoVs determiner module 148 for determining future FoVs of (e.g., of future time instants for a user device or a user viewing) the 360 degree video stream based on a requested FoV (e.g., at the one time instant by the user device, such as for the user), and a prefetcher module 150 for prefetching or causing to be prefetched video streams for the future FoVs (e.g., of the future time instants).

The mass storage device 2230 may comprise any type of storage device configured to store data, programs, and other information and to make the data, programs, and other information accessible via the bus 2270. The mass storage device 2230 may comprise, for example, one or more of a solid state drive, hard disk drive, a magnetic disk drive, an optical disk drive, or the like.

The processing unit 2201 also includes one or more network interfaces 2250, which may comprise wired links, such as an Ethernet cable or the like, and/or wireless links to access nodes or one or more networks 2280. The network interface 2250 allows the processing unit 2201 to communicate with remote units via the networks 2280. For example, the network interface 2250 may provide wireless communication via one or more transmitters/transmit antennas and one or more receivers/receive antennas. In an embodiment, the processing unit 2201 is coupled to a local-area network or a wide-area network for data processing and communications with remote devices, such as other processing units, the Internet, remote storage facilities, or the like.

Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment. Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

Some embodiments herein may be implemented in computer-readable non-transitory media that includes all types of computer readable media, including magnetic storage media, optical storage media, and solid state storage media and specifically excludes signals. It should be understood that the software can be installed in and sold with the measurer module 142, measurer module 144, determiner module 148 and prefetcher module 150 (optional). Alternatively the software can be obtained and loaded into the measurer module 142, measurer module 144, determiner module 148 and prefetcher module 150 (optional), including obtaining the software via a disc medium or from any manner of network or distribution system, including, for example, from a server owned by the software creator or from a server not owned but used by the software creator. The software can be stored on a server for distribution over the Internet, for example.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer implemented method for providing a 360 degree video stream in a network, the 360 degree video stream comprising multiple video streams corresponding to multiple Field of Views (FoVs), the method comprising:
    measuring a network round trip time (RTT) for a requested FoV of the 360 degree video stream, the RTT indicating a time interval between sending an FoV interest message and receiving a response message in reply to the requested FoV;
    measuring a network bandwidth for the requested FoV of the 360 degree video stream, the measured network bandwidth representing an amount of data the network transmits in the response message;
    determining a future FoV of the 360 degree video stream based on the requested FoV, the measured network bandwidth and the measured network RTT; and
    prefetching a video stream for the future FoV of the 360 degree video stream.

2. The computer implemented method of claim 1, wherein determining a future FoV includes:
    selecting a size of the future FoV based on the requested FoV and the measured network RTT; and
    selecting an amount of data of the future FoV based on the requested FoV, the selected size of the future FoV and the measured network bandwidth.

3. The computer implemented method of claim 2, wherein selecting the size of the future FoV includes creating a requested FoV having the selected size by:
    adding an amount of height and width to the requested FoV based on an amount that the measured network RTT is greater than a threshold RTT, or
    subtracting an amount of height and width from the requested FoV based on an amount that the measured network RTT is less than the threshold RTT.

4. The computer implemented method of claim 3, wherein:
    the future FoV includes the requested FoV having the selected size; and
    the selecting the amount of data of the future FoV includes:
        adding an amount of data to the future FoV based on an amount that the measured network bandwidth is greater than a threshold network bandwidth, or
        subtracting an amount of data from the future FoV based on an amount that the measured network bandwidth is less than the threshold network bandwidth.

5. The computer implemented method of claim 4, further comprising:
    selecting the threshold RTT to be a previously measured RTT; and
    selecting the threshold network bandwidth to be an amount of data bandwidth for sending data to satisfy the requested FoV having the selected size, at a link capacity of the network during the measured RTT.

6. The computer implemented method of claim 4,
    wherein prefetching comprises sending a current FoV interest message towards a source of the 360 degree video stream, the current FoV interest message including a request for the determined future FoV; and
    further comprising sending the FoV interest message to the source at a prior time instant of the 360 degree video stream, the FoV interest message including a request for the FoV.

7. A 360 degree video stream in a network provider device, the 360 degree video stream comprising multiple video streams corresponding to multiple FoVs, the device comprising:
   a memory storage comprising instructions; and
   one or more processors in communication with the memory storage, wherein the one or more processors execute the instructions to:
      measure a network round trip time (RTT) for a requested FoV of the 360 degree video stream, the RTT indicating a time interval between sending an FoV interest message and receiving a response message in reply to the requested FoV;
      measure a network bandwidth for the requested FoV of the 360 degree video stream, the measured network bandwidth representing an amount of data the network transmits in the response message;
      determine a future FoV of the 360 degree video stream based on the requested FoV, the measured network bandwidth and the measured network RTT; and
      prefetch a video stream for the future FoV of the 360 degree video stream.

8. The device of claim 7, wherein determining a future FoV includes:
   selecting a size of the future FoV based on the requested FoV and the measured network RTT; and
   selecting an amount of data of the future FoV based on the requested FoV, the selected size of the future FoV and the measured network bandwidth.

9. The device of claim 8, wherein selecting the size of the future FoV includes creating a requested FoV having the selected size by:
   adding an amount of height and width to the requested FoV based on an amount that the measured network RTT is greater than a threshold RTT, or
   subtracting an amount of height and width from the requested FoV based on an amount that the measured network RTT is less than the threshold RTT.

10. The device of claim 9, wherein:
   the future FoV includes the requested FoV having the selected size; and
   the selecting the amount of data of the future FoV includes:
      adding an amount of data to the future FoV based on an amount that the measured network bandwidth is greater than a threshold network bandwidth, or
      subtracting an amount of data from the future FoV based on an amount that the measured network bandwidth is less than the threshold network bandwidth.

11. The device of claim 10, wherein the one or more processors further execute the instructions to
   select the threshold RTT to be a previously measured RTT; and
   select the threshold network bandwidth to be an amount of data bandwidth for sending data to satisfy the requested FoV having the selected size, at a link capacity of the network during the measured RTT.

12. The device of claim 10,
   wherein prefetching comprises sending a current FoV interest message towards a source of the 360 degree video stream, the current FoV interest message including a request for the determined future FoV; and
   wherein the one or more processors further execute the instructions to send the FoV interest message to the source at a prior time instant of the 360 degree video stream, the FoV interest message including a request for the FoV.

13. A non-transitory computer-readable medium storing computer instructions for providing a 360 degree video stream in a network, the 360 degree video stream comprising multiple video streams corresponding to multiple FoVs, that when the computer instructions are executed by one or more processors, cause the one or more processors to perform the steps of:
   measuring a network round trip time (RTT) for a requested FoV of the 360 degree video stream, the RTT indicating a time interval between sending an FoV interest message and receiving a response message in reply to the requested FoV;
   measuring a network bandwidth for the requested FoV of the 360 degree video stream, the measured network bandwidth representing an amount of data the network transmits in the response message;
   determining a future FoV of the 360 degree video stream based on the requested FoV, the measured network bandwidth and the measured network RTT; and
   prefetching a video stream for the future FoV of the 360 degree video stream.

14. The non-transitory computer-readable medium of claim 13, wherein determining a future FoV includes:
   selecting a size of the future FoV based on the requested FoV and the measured network RTT; and
   selecting an amount of data of the future FoV based on the requested FoV, the selected size of the future FoV and the measured network bandwidth.

15. The non-transitory computer-readable medium of claim 14, wherein selecting the size of the future FoV includes creating a requested FoV having the selected size by:
   adding an amount of height and width to the requested FoV based on an amount that the measured network RTT is greater than a threshold RTT, or
   subtracting an amount of height and width from the requested FoV based on an amount that the measured network RTT is less than the threshold RTT.

16. The non-transitory computer-readable medium of claim 15, wherein:
   the future FoV includes the requested FoV having the selected size; and
   the selecting the amount of data of the future FoV includes:
      adding an amount of data to the future FoV based on an amount that the measured network bandwidth is greater than a threshold network bandwidth, or
      subtracting an amount of data from the future FoV based on an amount that the measured network bandwidth is less than the threshold network bandwidth.

17. The non-transitory computer-readable medium of claim 16, further causing the one or more processors to perform the steps of:
   selecting the threshold RTT to be a previously measured RTT; and
   selecting the threshold network bandwidth to be an amount of data bandwidth for sending data to satisfy the requested FoV having the selected size, at a link capacity of the network during the measured RTT.

18. The non-transitory computer-readable medium of claim 16,
   wherein prefetching comprises sending a current FoV interest message towards a source of the 360 degree video stream, the current FoV interest message including a request for the determined future FoV; and
further causing the one or more processors to perform the step of sending the FoV interest message to the source at a prior time instant of the 360 degree video stream, the FoV interest message including a request for the FoV.

* * * * *

UNITED STATES PATENT AND TRADEMARK OFFICE
CERTIFICATE OF CORRECTION

PATENT NO. : 10,819,645 B2
APPLICATION NO. : 16/047865
DATED : October 27, 2020
INVENTOR(S) : Westphal et al.

It is certified that error appears in the above-identified patent and that said Letters Patent is hereby corrected as shown below:

On the Title Page

• Item (57), Column 2, Line 13 of the Abstract: please replace "prefecthced" with --prefetched--

Signed and Sealed this
Twenty-fourth Day of May, 2022

*Katherine Kelly Vidal*

Katherine Kelly Vidal
*Director of the United States Patent and Trademark Office*